(12) United States Patent
Niamut et al.

(10) Patent No.: US 11,356,695 B2
(45) Date of Patent: Jun. 7, 2022

(54) VIDEO CODING BASED ON GLOBAL MOTION COMPENSATED MOTION VECTOR PREDICTORS

(71) Applicants: KONINKLIJKE KPN N.V., Rotterdam (NL); NEDERLANDSE ORGANISATIE VOOR TOEGEPAST-NATUURWETEN-SCHAPPELIJK ONDERZOEK TNO, s-Gravenhage (NL)

(72) Inventors: Omar Aziz Niamut, Vlaardingen (NL); Emmanuel Thomas, Delft (NL); Alexandre Da Silva Pratas Gabriel, The Hague (NL)

(73) Assignees: Koninklijke KPN N.V., Rotterdam (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 0 days.

(21) Appl. No.: 17/276,260

(22) PCT Filed: Sep. 13, 2019

(86) PCT No.: PCT/EP2019/074476
§ 371 (c)(1),
(2) Date: Mar. 15, 2021

(87) PCT Pub. No.: WO2020/053383
PCT Pub. Date: Mar. 19, 2020

(65) Prior Publication Data
US 2022/0030264 A1    Jan. 27, 2022

(30) Foreign Application Priority Data

Sep. 14, 2018    (EP) .................................... 18194480

(51) Int. Cl.
    *H04N 19/513*     (2014.01)
    *H04N 19/176*     (2014.01)
    *H04N 19/184*     (2014.01)

(52) U.S. Cl.
    CPC ......... *H04N 19/513* (2014.11); *H04N 19/176* (2014.11); *H04N 19/184* (2014.11)

(58) Field of Classification Search
None
See application file for complete search history.

(56) References Cited

U.S. PATENT DOCUMENTS

| | | |
|---|---|---|
| 2017/0118475 A1 | 4/2017 | Chang et al. |
| 2018/0220156 A1 | 8/2018 | Kim |
| 2019/0349598 A1 | 11/2019 | Aminlou et al. |
| 2020/0021841 A1* | 1/2020 | Leontaris ............. H04N 19/196 |
| 2020/0045342 A1 | 2/2020 | Bordes et al. |
| 2020/0260111 A1 | 8/2020 | Liu et al. |

FOREIGN PATENT DOCUMENTS

| | | |
|---|---|---|
| EP | 3301928 A1 | 4/2018 |
| EP | 3301930 A1 | 4/2018 |
| WO | 2017087751 A1 | 5/2017 |

OTHER PUBLICATIONS

Combined PCT International Search Report and Written Opinion, Application No. PCT/EP2019/074476, dated Nov. 11, 2019, 12 pages.

(Continued)

*Primary Examiner* — Christopher G Findley
(74) *Attorney, Agent, or Firm* — McDonnell Boehnen Hulbert & Berghoff LLP

(57) ABSTRACT

A method of determining a bitstream is described, the method including: determining a motion vector (MV) of a current block of a current video frame of a sequence of video frames comprising video data captured by a camera, the MV defining an offset of the current block relative to a prediction block, wherein part of the offset is caused by global motion in the video data if the camera is moving relative to a scene; determining motion vector predictor MW candidates for (Continued)

predicting the MV, the MW candidates being determined based on MVs of already encoded blocks; determining a motion compensation vector MCV for MW candidates, determining global motion compensated MW candidates based on a difference between a MW candidate and an associated MCV; selecting a compensated MW; and, determining a motion vector difference MVD based on the compensated MW and the MW; and, using entropy coding to code, the MVD, an indication of the selected compensated MW; and, conversion information for converting a MVP into a compensated MW, into a bitstream.

16 Claims, 16 Drawing Sheets

(56) References Cited

OTHER PUBLICATIONS

Sze, Vivienne, Madhukar Budagavi, and Gary J. Sullivan. "High efficiency video coding (HEVC)." In Integrated circuit and systems, algorithms and architectures, vol. 39, 11 pgs. Springer, 2014.
Vishwanath, Bharath, Tejaswi Nanjundaswamy, and Kenneth Rose. "Rotational motion model for temporal prediction in 360 video coding." In 2017 IEEE 19th International Workshop on Multimedia Signal Processing (MMSP), pp. 1-6. IEEE, 2017.

* cited by examiner

VIDEO CODING BASED ON GLOBAL MOTION COMPENSATED MOTION VECTOR PREDICTORS

CROSS REFERENCE TO RELATED APPLICATIONS

The present application is a national stage entry of, and claims priority to, PCT/EP2019/074476, filed on Sep. 13, 2019, which claims priority to European Patent Application EP 18194480.2, filed in the European Patent Office on Sep. 14, 2018, both of which are hereby incorporated in their entirety herein by reference.

FIELD OF THE INVENTION

The invention relates to video coding based on global motion compensated motion vector predictors, and, in particular, though not exclusively, to methods and systems for video coding based on global motion compensated motion vector predictors, a video decoder apparatus and a video encoder apparatus using such methods and a computer program product for executing such methods.

BACKGROUND OF THE INVENTION

State of the art video coding standards use a hybrid block-based video coding scheme wherein a video frame is partitioned into video blocks which are subsequently encoded using predictive block-based compression techniques. Here, a video block or in short a block refers to a basic processing unit of a video standard, e.g., coding tree units (CTUs) as defined in HEVC, macroblocks as defined in AVC and super blocks as defined in VP9 and AVC1. In certain video coding standards, such as HEVC, blocks may be partitioned into smaller sub-blocks e.g. Coding Units (CUs) and Prediction Units (PUs). Different prediction modes may be used to code each of the blocks or sub-blocks. For example, different intra-prediction modes may be used to code a block based on predictive data within the same frame so as to exploit spatial redundancy within a video frame. Additionally, inter-prediction modes may be used to code a block based on predictive data from another frame so that temporal redundancy across a sequence of video frames can be exploited.

Inter-prediction uses a motion estimation technique to determine motion vectors (MVs), wherein a motion vector identifies a block in an already encoded reference video frame (past or future video frame) that is suitable for predicting a block in a video frame that needs to be encoded wherein the block that needs to be encoded and its associated MV are typically referred to as the current block and the current MV respectively. The difference between a predictive block and a current block may define a residual block, which can be encoded together with metadata, such as the MV and transmitted to a video playout device that includes a video decoder for decoding the encoded information using the metadata. In turn, MVs may be compressed by exploiting correlations between motion vectors of blocks that have been already encoded and a motion vector of a current block. Translational moving objects in video pictures typically cover many blocks that have similar motion vectors in directions and length. Video coding standards typically exploit this correlation.

For example, motion vector compression schemes such as the so-called Advanced Motion Vector Prediction (AMVP) algorithm used by HEVC or the Dynamic Reference Motion Vector Prediction (REFMV) used by AV1, aim to compress information about motion vectors in the bitstream by using a motion vector that already have been calculated as a reference for predicting a current MV. Such motion vector may be referred to as a motion vector predictor (MVP). In this scheme, a MVP for a MV of a current block may be generated by determining candidate MVs of already encoded blocks of the current video frame or co-located blocks of an encoded reference video frame and selecting a candidate MV as the best predictor, a MVP, for the current block based on an optimization scheme such as a well-known rate distortion and optimization (RDO) scheme. The difference between the MVP and the MV and information about the selected motion vector predictor is entropy coded into a bitstream. The decoder uses the information of the selected MVP and the MV difference to reconstruct a motion vector of a current block that needs to be decoded. The motion vector compression schemes of the video standards are all based on the fact that blocks close to the current block, e.g. neighbouring blocks in the same video frame or co-located blocks in a reference frame, will typically have the same or similar motion vector values due to the spatial correlation of pixels in blocks of consecutive frames.

A problem associated with the inter-prediction algorithms used by most coding standards is that these algorithms assume that the motion relates to translational movement of objects in the video. This movement of objects in pictures is sometimes referred to as local motion. Motion vectors determined by a motion estimation technique however provide an estimate of all motion in video blocks of a video frame, local motion associated with moving objects as well as global motion associated with a moving background caused by a moving camera. Conventional inter-prediction schemes are optimized for local motion but are not designed to deal with global motion effects.

Video coding schemes that can deal with both local and global motion are known. For example, the Advanced Simple Profile (ASP) of the MPEG-4 standard includes an inter-prediction scheme that includes both local motion estimation (LME) and global motion estimation (GME) for blocks in a video frame. The encoder may select for each block, the best prediction, i.e. either a prediction based on the LME mode or a prediction based on the GME mode. If the GME mode is selected for one or more blocks in a video frame a set of global motion parameters for a video frame is coded and sent in the bitstream to the decoder apparatus. Motion vectors are determined for blocks for which the LME mode is selected. Due to the increased complexity and computation load at both the encoder and the decoder side the proposed Advanced Simple Profile scheme was less suitable for hardware implementation. Moreover, the gain that can be achieved by the GME process was relatively little as in conventionally produced (2D) video, global motion effects due to camera motion, e.g. zooming or panning, are relatively short and not easy to predict.

Currently an increasing number of professional and consumer-grade cameras are able to produce 360-degree video content. Such video content (also referred to as omnidirectional content), which can be regarded as pixels arranged on a spherical surface (sometimes referred to as a pixel sphere or a sphere of pixels), is hereafter referred to in short by the term spherical content. The delivery of spherical content usually requires a higher bandwidth than conventional video. Spherical content represents a wider field of view than conventional videos (which may be based on a rectilinear or curvilinear projection) and thus contains more information than conventional (2D) video. Moreover, in order to provide an "immersive" video experience, spherical video content often contains relatively long scenes which are captured using a translational moving camera (e.g. a camera mounted on a drone, a car, a bike or carried by the camera man moving at a certain speed in a certain direction).

A typical video processing pipeline for spherical video may include: capturing of panoramic images with a panoramic or 360-degree image capturing system, stitching the images together in an image stitching operation into spherical video data and projecting the spherical video data onto a 2D rectangular surface of a video frame using a suitable projection model. The resulting video frame may be referred to as a projected video frame. Different projection models, such as an equirectangular projection (ERP), cube or pyramid projection model can be used for generating projected video frames, which can be coded using existing video coding standards, such as H.264/AVC, H.265/HEVC, VP9 and AV1. The encoded spherical video data may be stored on a storage medium or provided to (e.g. transmitted to) media playback devices. A decoder apparatus may decode the encoded video frames and a rendering engine may render the spherical content on a suitable display device, e.g. a head mounted device (HMD) or the like. In spherical video, wherein video data in video frames are a result of a projection of a 3D world-scene onto the imaging plane of a physically moving 360 camera, the effect of global motion is particularly pronounced. In that case, the global motion field in projected video frames due to camera movement cannot be efficiently processed by known inter-prediction scheme thereby substantially reducing the encoding efficiency.

In their article, Vishwanath et al, "Rotational motion model for temporal prediction in 360 video coding", explain that 360-video projected onto a 2D imaging plane of a camera yields non-linear motion in video frames which needs to be processed by a state of the art video coding system. The non-linear motion degrades the compression efficiency and the authors propose to solve this problem by using a spherical model wherein motion in video pictures is described as angular motion on the sphere of pixels. This model is used in a motion estimation process of an HEVC encoder. Although a description of the motion in 360-video in terms of spherical coordinates may lead to a more accurate determination of the motion vectors of video blocks of a video frame, it does not solve the problem of a global motion field in video frames due to camera motion and the difficulty of compressing motion vectors that include global motion. Motion vectors that include a global motion component projected on a 2D video frame cannot be efficiently handled by state of the art inter-prediction schemes since the correlation of motion vectors in that case violates the assumption described earlier, i.e. strong spatial correlation of motion vector direction and amplitude, which can lead to substantial compression inefficiencies.

Hence, from the above it follows there is a need in the art for improved methods and systems for coding of video data that includes a global motion field that is caused by motion, in particular camera motion.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the user's computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Additionally, the Instructions may be executed by any type of processors, including but not limited to one or more digital signal processors (DSPs), general purpose microprocessors, application specific integrated circuits (ASICs), field programmable logic arrays (FP-GAs), or other equivalent integrated or discrete logic circuitry.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments in this application aim to improve the efficiency of coding video, in particular 360 video, but also any other type of video that has global motion due to movement of the camera position of the camera that captures the video which can either be a virtual (computer generated world) or a real camera. Here, the movement may be associated with a physically moving camera (e.g. due to a panning or tilting operation), or with a virtually moving camera (e.g. due to a zooming action). The improvements include compensating of global motion in the video during the video coding process so that effects associated with global motion that suppress the coding efficiency are removed.

The inventors recognized that a global motion field in video frames due to translational movement of a camera has a distinct pattern, which may depend on the type of video data in the video frames. The global motion is particularly distinct in case of spherical video, wherein the characteristic pattern of the global motion may depend on the projection that is used to project the spherical video onto a rectangular 2D plane of a video frame. For example, in an equirectangular (ERP) projected video frame, camera motion may cause a characteristic pattern in the video including an expansion point and a compression point in the video frames. Pixels in the area around expansion points may have motion vectors that point in opposite direction with the origin located at the same point (expansion point) and pixels in the area around compression points may have motion vectors that point toward the same point (compression point) causing complex but accurately predictable motion patterns in these two types of area. Such patterns can be predicted using a simple parametric algorithm that models the movement of the camera in the 3D scene, hence causing a global motion in the captured video. It should be noted that global motion may also be present in conventional (e.g. non-spherical) video captured with a moving camera position, which global motion may become more pronounced with the speed of movement and the angle of view. Also in conventional video the global motion patterns (e.g. the components of motion vectors) that are the result of global motion may be suitable for modelling on the basis of parametric algorithms (parametric functions), or simply be determined analysing the video, using a suitable image processing algorithm, and be used for generating a motion compensation map comprising motion compensation vectors.

In an aspect, the invention may relate to a method of providing a bitstream comprising video data encoded by an encoder apparatus. In an embodiment, the method may include: determining, preferably by a processor of the encoder apparatus, a motion vector of a current block of a current video frame of a sequence of video frames comprising video data captured by at least one video capturing device, the motion vector defining an offset of the current block relative to a prediction block of an already encoded first reference video frame stored in a memory of the encoder apparatus, wherein at least part of the offset defined by the motion vector is associated with global motion in the video data if the video capturing device is moving relative to a scene; a difference between the current block and the prediction block defining a residual block. Here, prediction blocks may be interpolated from the samples of the reference frames when sub-pixel accuracy is used for the motion vectors. In addition, motion models more complex than translational, e.g. with rotation and/or scaling, may also require interpolation of the value of the prediction block based on the samples of the reference frames. Preferably one video capturing device is used to capture the video data, but technically it could be two or more separate capturing devices, each capturing part of the video data. The video data are preferably spherical video data captured by one or more capturing devices that have been projected onto a rectangular video frame on the basis of a projection model.

Additionally, prediction blocks may define any collection of samples, including rectangular shaped collections of samples, from the reference frames that can be used to calculate the prediction of samples of the blocks of a video frame.

The method may also include determining, preferably by the processor, motion vector predictor candidates for predicting the motion vector, the motion vector predictor candidates being determined by the processor based on one or more motion vectors of one or more already encoded blocks of the current video frame and/or one or more already encoded blocks of one or more reference video frames, preferably the first reference video frame, stored in the memory of the encoder apparatus.

Further, the method may include: determining or receiving, preferably by the processor, a motion compensation vector for each of the motion vector predictor candidates, a motion compensation vector providing an estimate of a part of a motion vector predictor candidate that is associated with global motion; determining, preferably by the processor, global motion compensated motion vector predictor candidates, each of the compensated motion vector predictor candidates being determined based on a difference between a motion vector predictor candidate and an associated motion compensation vector; selecting, preferably by the processor, a compensated motion vector predictor from the global motion compensated motion vector predictor candidates; and, determining, preferably by the processor, a motion vector difference based on the compensated motion vector predictor and the motion vector.

Additionally, the method may include using, preferably by the processor, an entropy coding algorithm to code the residual block, the motion vector difference, an indication, preferably a binary flag, that the motion vector difference is based on a difference between the motion vector and a compensated motion vector predictor; an indication of the selected compensated motion vector predictor; and, conversion information for converting a motion vector predictor into a compensated motion vector predictor, into a bitstream.

Hence, motion vectors predictors of blocks of a video frame are compensated for global motion using motion compensation vectors wherein each motion compensation vector provides an estimate of the global motion for pixels of a block. Compensation of the global motion during the video encoding process enables efficient compression of the motion vector based on motion vector predictors in case global motion is present in the video data that needs to be encoded.

In an embodiment, the candidate list may be an indexed list and wherein the indication of the compensated motion vector predictor selected by the encoder apparatus includes an index of the motion vector predictor in the candidate list. By using an indexed list only the index of the selected motion vector needs to transmitted in the bitstream.

In an embodiment, the conversion information may comprise an indication of an algorithm used by the encoder apparatus to determine the motion compensation vector and/or, one or more parameters for an algorithm stored in the decoder to determine the motion compensation vector. This information may signal the decoder apparatus which algorithm was used by the encoder apparatus to determine the motion compensation vectors.

In an embodiment, at least part of the one or more parameters may be associated with the movement of the video capturing device relative to the scene.

In an embodiment, the at least part of the one or more parameters may include: a speed of the video capturing device relative to the scene, a height of the video capturing device relative to a reference point or a direction in which the video capturing device is moving relative to the scene. The parameters may be used by the decoder apparatus to calculate motion compensation vectors based on a parametric algorithm stored in the memory of the decoder apparatus.

In an embodiment, the motion compensation vector may be part of a motion compensation map comprising motion compensation vectors for blocks of the current video frame and/or the reference video frame.

In an embodiment, the conversion information may comprise the motion compensation vector or a motion compensation map comprising motion compensation vectors for blocks of the current video frame, for blocks of one or more video frames of the sequence of video frames.

In an embodiment, determining a motion vector difference may include at least one of the steps of: determining a first motion vector difference candidate based on the compensated motion vector predictor and the motion vector; and, a second motion vector difference candidate based on the motion vector predictor and the motion vector; and, selecting the motion vector difference from the first and second motion vector difference candidate based on an optimization process, preferably a rate-distortion optimization RDO process. Thus, an optimization method such as an RDO scheme may be used to determine whether the use of the global motion compensated motion vector predictors results in an improved compression efficiency. If RDO costs relating to compensated motion vector predictors are higher than the RDO costs relating to non-compensated motion vector predictors, then the encoder apparatus may determine to code the block using conventional motion vector predictors.

In an embodiment, the motion compensation vector may be determined based on a parametric algorithm, wherein the algorithm may be configured to generate an estimate of the global motion for the current block of the video frame. In an embodiment, the algorithm may represent a parametric world model, e.g. a (2-plane) world model including top and bottom planes. Hence, a parametric algorithm representing a simple model of the global motion in sequence of video frames due to movement of the camera, which is known to the encoder and the decoder, may be used to determine motion compensation vectors.

In an embodiment the parametric algorithm depends on a projection model used to project the video data onto a frame. In a further embodiment the parametric algorithm depends on one or more camera parameters. For example the translational (or rotational) velocity of the camera, camera height, zooming speed etc.

In embodiments of the invention, the parametric algorithm depends on both the projection model as well as one or more camera parameters.

In an embodiment, the motion compensation vector may be determined based on an image processing algorithm. In an embodiment, the algorithm may be configured to determine a motion field in the current video frame, a motion field including a motion vector associated with a pixel or a block of pixels of the current video frame. In an embodiment, the algorithm may be configured to classify motion vectors of the motion field in motion vectors representing local motion in the current video frame and motion vectors representing global motion in the current video frame. Thus, if motion compensation vectors are transmitted in the bitstream, any algorithm can be used to determine motion compensation vectors that provide an estimate of the global motion in the video frames.

In an embodiment, the video capturing device may be adapted to capture spherical video data and wherein video frames of the sequence of video frames comprise spherical video data that preferably have been projected onto a rectangular video frame on the basis of a projection model. In an embodiment, the projection model may be an equirectangular or a cubic projection model or any other suitable projection model. The invention is particular suitable for spherical video for which the effects of global motion due to camera movement, in particular translation camera movement, are particularly pronounced.

In an embodiment, at least part of the conversion information may be included in the bitstream. In an embodiment, at least part of the conversion information may be contained in one or more SEI messages; and/or, one or more network abstraction layer, NAL. In an embodiment, at least one of the one or more NAL units may be a non-VCL NAL unit such as a Picture Parameter Set, PPS.

In an embodiment, the determining of the motion vector and the motion vector predictor and the coding may be based on a coding standard. In an embodiment, the coding standard including at least one of the AVC, HEVC, VP9, AV1 coding standards or a coding standard based on of the AVC, HEVC, VP9, AV1 coding standards.

In an aspect, the invention may also relate to a method for reconstructing a block of a video frame from a bitstream encoded by an encoder apparatus. In an embodiment, the method may include one or more of the following steps: receiving, preferably by a processor of a decoder apparatus, a bitstream comprising a current block of a current video frame to be reconstructed by the decoder apparatus based an already decoded prediction block of a first reference video frame stored in the memory of the decoder apparatus and based on a motion vector representing an offset of the current block relative to the prediction block, a difference between the prediction block and the current block defining a residual block; using, preferably by the processor, an entropy coding process to decode the bitstream into a residual block, a motion vector difference, an indication, preferably a binary flag, that the motion vector difference is based on a difference between a motion vector and a compensated motion vector predictor; an indication of a selected compensated motion vector predictor; and, conversion information for converting a motion vector predictor into a compensated motion vector predictor; determining, preferably by the processor, motion vector predictor candidates for predicting the motion vector of the current block, a motion vector predictor candidate defining a motion vector of an already decoded block of the current video frame or a motion vector of an already decoded block of a reference video frame, preferably the first reference video frame, stored in the memory of the decoder apparatus; the processor using the conversion information for determining a motion compensation vector for each of the motion vector predictor candidates, a motion compensation vector providing an estimate of a part of a motion vector predictor candidate that is associated with global motion, the global motion caused by movement of a video capturing device relative to a scene; determining, preferably by the processor, global motion compensated motion vector predictor candidates, each of the compensated motion vector predictor candidates being determined based on a difference between a motion vector predictor candidate and an associated motion compensation vector; selecting a compensated motion vector predictor from the compensated motion vector predictor candidates based on the indication of a selected compensated motion vector predictor; and, determining, preferably by the processor, the motion vector of the current block based on the compensated motion vector predictor and the motion vector difference; and, reconstructing, preferably by the processor, the current block on the basis of the prediction block and the residual block, the reconstruction including using the motion vector to identify the prediction block of the reference video frame stored in the memory of the decoder apparatus.

In a further aspect, the invention may relate to an encoding apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations. In an embodiment, the executable operations may comprise one or more of the following steps comprising: determining a motion vector of a current block of a current video frame of a sequence of video frames comprising video data captured by a video capturing device, the motion vector defining an offset of the current block relative to a prediction block of an already encoded first reference video frame stored in a memory of the encoder apparatus, wherein at least part of the offset is associated with global motion in the video data if the video capturing device is moving relative to a scene; a difference between the current block and the prediction block defining a residual block; determining or receiving a motion compensation vector for each of the motion vector predictor candidates, a motion compensation vector providing an estimate of a part of a motion vector predictor candidate that is associated with global motion; determining or receiving a motion compensation vector for each of the motion vector predictor candidates, a motion compensation vector representing an estimate of global motion of pixels of an already encoded bock of the current video frame or an already encoded block of one of the one or more reference video frames, the global motion resulting from movement of the video capturing device relative to the scene; determining global motion compensated motion vector predictor candidates, each of the compensated motion vector predictor candidates being determined based on a difference between a motion vector predictor candidate and an associated motion compensation vector; selecting a compensated motion vector predictor from the global motion compensated motion vector predictor candidates; and, determining a motion vector difference based on the compensated motion vector predictor and the motion vector; using an entropy coding algorithm to code the residual block, the motion vector difference, an indication, preferably a binary flag, that the motion vector difference is based on a difference between the motion vector and a compensated motion vector predictor; an indication of the selected compensated motion vector predictor; and, conversion information for converting a motion vector predictor into a compensated motion vector predictor, into a bitstream.

In a further embodiment, the invention may relate to an encoding apparatus configured to execute any of the encoding processes defined in this application.

In an aspect, the invention may also relate to a decoding apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising. In an embodiment, the executable operations may comprise one or more of the following steps: receiving a bitstream comprising a current block of a current video frame to be reconstructed by the decoder apparatus based an already decoded prediction block of a first reference video frame stored in the memory of the decoder apparatus and based on a motion vector representing an offset of the current block relative to the prediction block, a difference between the prediction block and the current block defining a residual block; using an entropy coding process to decode the bitstream into a residual block, a motion vector difference, an indication, preferably a binary flag, that the motion vector difference is based on a difference between a motion vector and a compensated motion vector predictor; an indication of a selected compensated motion vector predictor; and, conversion information for converting a motion vector predictor into a compensated motion vector predictor; determining motion vector predictor candidates for predicting the motion vector of the current block, a motion vector predictor candidate defining a motion vector of an already decoded block of the current video frame or a motion vector of an already decoded block of a reference video frame, preferably the first reference video frame, stored in the memory of the decoder apparatus; using the conversion information for determining a motion compensation vector for each of the motion vector predictor candidates, a motion compensation vector providing an estimate of a part of a motion vector predictor candidate that is associated with global motion, the global motion resulting from movement of a video capturing device relative to a scene; determining global motion compensated motion vector predictor candidates, each of the compensated motion vector predictor candidates being determined based on a difference between a motion vector predictor candidate and an associated motion compensation vector; selecting a compensated motion vector predictor from the compensated motion vector predictor candidates based on the indication of a selected compensated motion vector predictor; and, determining the motion vector of the current block based on the compensated motion vector predictor and the motion vector difference; and, reconstructing the current block on the basis of the prediction block and the residual block, the reconstruction including using the motion vector to identify the prediction block of the reference video frame stored in the memory of the decoder apparatus.

In a further embodiment, the invention may relate to a decoding apparatus configured to execute any of the decoding processes defined in this application.

The invention may also relate to a computer program product comprising software code portions configured for, when run in the memory of a computer, executing the method steps according to any of process steps described above. In this application the following abbreviations and terms are used:

AMVP Advanced Motion Vector Prediction
ERP Equirectangular Projection
RDO Rate Distortion Optimization
360 video a video that represents a scene from a single position in a 3D space containing visual content for the complete or partial spherical view of the scene.
MV a two-dimensional vector used for inter-prediction that defines an offset (Dx,Dy) of a current block relative to a prediction block of an already encoded reference video frame (past or future) stored in a memory of an encoder or decoder. The motion vector represents an estimate of the motion (in terms of magnitude and direction) of pixels of the current block
MV field the 2D space limited by the frame size in which motion vectors are located. The position of a motion vector is given by the position of the coding block to which it is associated.
motion
compensation map a set of motion compensation vectors for blocks in a video frame wherein each motion compensation vector provides an estimated contribution of the global motion to the motion of pixels of a block as defined by a motion vector MV. The estimated contributions may be defined in terms of a two dimensional vector (dx,dy) referred to as a motion compensation vector having an x component dx and an y component dy in the x,y plane of video frames.
MVP a motion vector predictor is a MV belonging to another already encoded or decoded block (of the current frame or a reference frame) which can be used as a predictor for the current MV in order to reduce the cost of coding the MVs (in terms of its x and y components).

The invention will be further illustrated with reference to the attached drawings, which schematically will show embodiments according to the invention. It will be understood that the invention is not in any way restricted to these specific embodiments.

DETAILED DESCRIPTION

Figure 1:
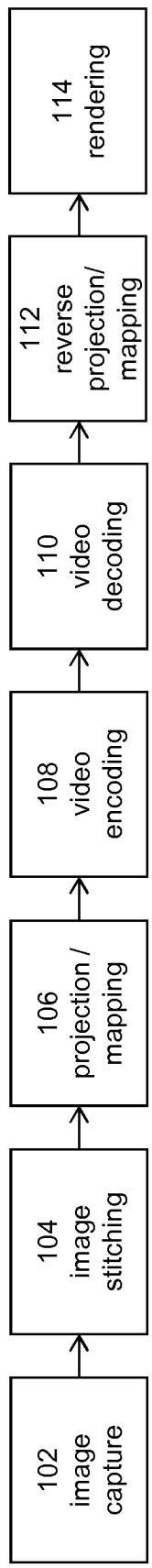
FIG. 1 depicts a flow-diagram of processing spherical video data.

FIG. 1 depicts a high-level flow diagram of a method for processing spherical content. The process may include capturing multiple images (step 102) using a panoramic or 360-degree image capturing system, which typically comprises multiple, i.e. two or more image sensors. Images of overlapping field of views, generated by different image sensors, may be stitched together (step 104) into one panorama or high-resolution image. Stitching of images into one image is a well-known image processing technique, that typically includes alignment and panorama composition. In the alignment process, feature descriptors may be extracted from images in order to find corresponding image features in different images that form a panorama composition. Alignment is used to estimate an image camera pose or orientation of each of the different images. The panorama composition procedure subsequently uses this information for combining the different images into one panorama image. Image blending may be used to seamlessly stitch the combined images together. The stitching of the images may be in a 2D or 3D space. For example, images may be stitched to each other onto a spherical surface thereby forming spherical video data. It should be stressed that although the invention as claimed is especially suitable for 360 video (e.g. omni directional), it is equally applicable to any type of video, including conventional video, wherein global motion is present that can be modelled.

Spherical video data of a panorama composition may be transformed and formatted by projection and mapping operations (step 106) into 2D rectangular video frames which are encoded by a state-of-the-art video encoder (step 108). The encoded video data may be encapsulated into a transport container so that the video data can be transmitted to a playout device comprising a video decoder, which is configured to decode the video data (step 110) into 2D rectangular frames. For presentation of the content to the user, the playout device renders a 3D (polyhedronic) object, and textures it with video data of decoded video frames (step 114). Depending on the projection that was used, decoded video frames are transformed back into omnidirectional video data by reversing the packing, mapping and projection operations (step 112). The encoding process 108 may be implemented in a video encoder apparatus and steps 110-114 may be implemented in a media playback device connected to or integrated in e.g. a head mounted display device (HMD).

Figure 2:
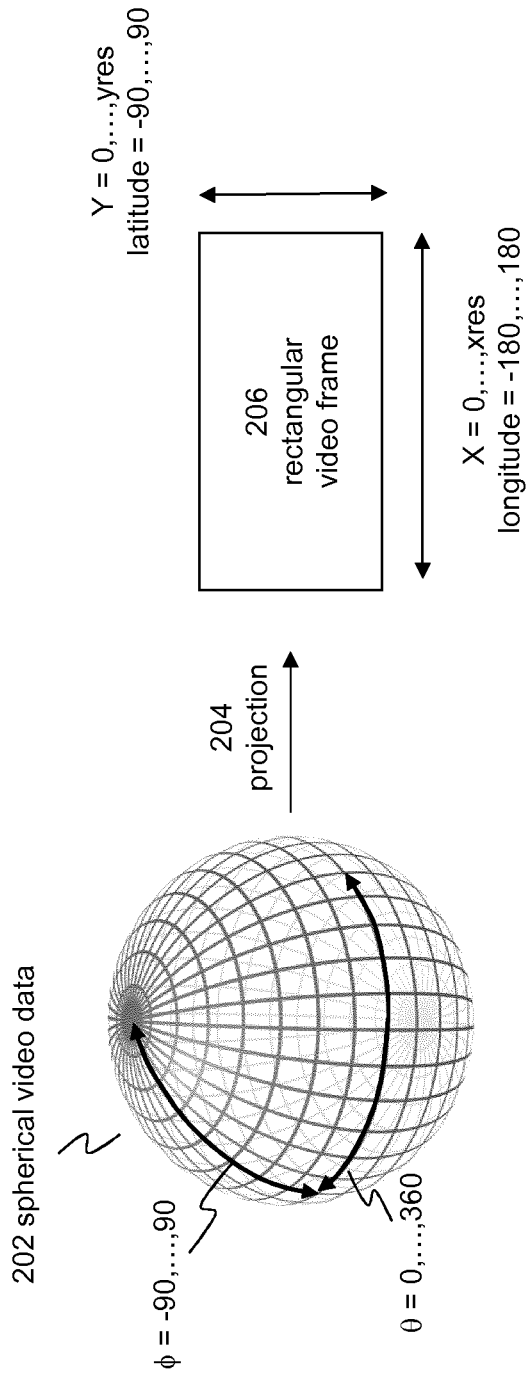
FIG. 2 depicts an example of an equirectangular projection of spherical video data.

The transformation of the spherical video data by projection and mapping operations into 2D rectangular video frames is described in more detail with reference to FIG. 2-4. FIG. 2 depicts an example of an equirectangular projection operation 204 of spherical video data 202 represented as pixels on a spherical surface (e.g. a sphere or a squished sphere), onto a rectangular 2D video frame 206. This projection operation may be used to directly transform pixels associated with spherical coordinates $\phi$, $\theta$ to pixels associated with planar 2D pixels with Cartesian coordinates (X,Y). This way, spherical video data can be transformed into a conventional video frame that can be processed by a conventional video coding system.

Figure 3A:
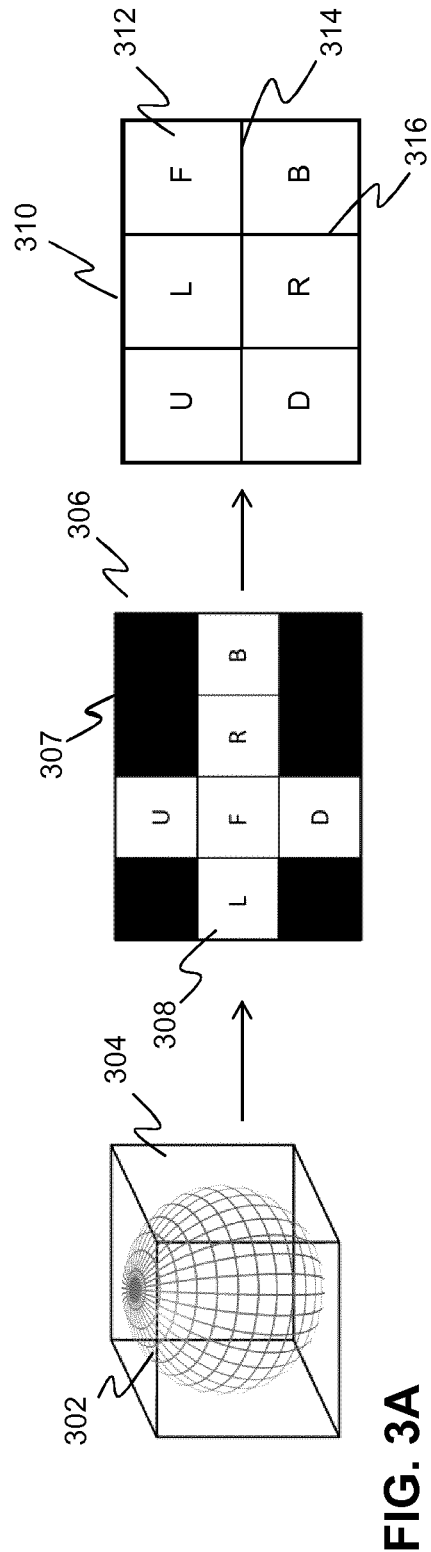
FIG. 3A-B depict different projections and mappings of spherical video data.
Figure 3B:
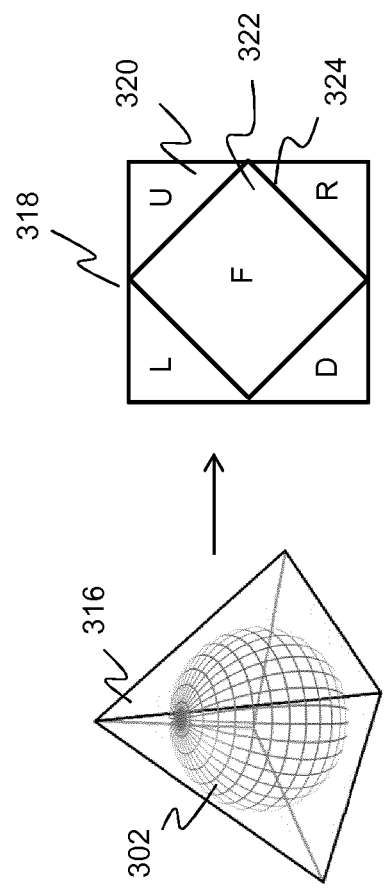

FIGS. 3A and 3B depict projection models for generating projected video frames. FIG. 3A depicts the projection of spherical video data 302 onto a rectangular video frame using a cubic projection model wherein spherical video data are projected onto faces 304 of a cube. These faces may be referred to as projection faces. The orientation of the sphere and the cube may be described using a 3D coordinate system such that different orientations of the sphere, the cube and the sphere relative to the cube can be defined. For example, in such coordinate system the projection faces may be labelled as front face (F), up face (U), down face (D), left face (L), right face (R) and back face (B). After the projection of the pixels onto the projection faces, the faces of the cube may be unfolded so that a planar 2D rectangular video frame 306 is formed wherein faces comprising the projected pixels are arranged in a 2D plane. Here, the pixels belonging to a projection face may be referred to as a pixel region or, in short, a region. For example, pixels associated with the front projection face L 308 of the cube form pixel region L in the rectangular video frame 306. The projection onto a face of a cube and unfolding process of the cube may be referred to as mapping and the result of the mapping may be referred to as a projected video frame. A projected video frame comprises an arrangement of pixel regions wherein edges of pixel regions may form region boundaries. The artificial region boundaries are a direct consequence of the mapping operation and the shape of the pixel regions are a direct consequence of the projection model that is use (in this case a cube projection model).

Depending on the projection model, after mapping, a projected video frame may include some areas 307 that do not comprise any video data. In order to improve compression efficiency, the pixel regions in the projected video frame may be rearranged and resized, hence removing the areas that do not comprise any video data. This process may be referred to as packing. The packing process results in a packed projected video frame 310 including rearranged pixel regions 312 and horizontally and vertically arranged region boundaries 314,316. Similarly, FIG. 3B depicts a pyramidal projection model 314 resulting in a projected video frame 318 including pixel regions 304,310,318,320 and associated region boundaries 306,312,313,322. Depending on the projection type the region boundaries may have different orientations in the video frame. Many different projection types may be used including but not limited to a cylinder, a polyhedron (e.g. an octahedron or an icosahedron), a truncated pyramid, segmented sphere, etc. The mapping and, optionally, packing of spherical video data into a projected video frame results in a video frame comprising a plurality of pixel regions.

In the context of 360 video, it is very likely that the video content will not be captured or computer-generated using a camera rotating around one of its axes. This is because motion in the video that is caused by a rotational camera displacement may trigger motion sickness to the viewer. Translational motion however, in particular slow translational motion, is acceptable for most of the users. Hence, camera motion in 360 video is predominantly translational camera motion. If camera translation is possible, typically a scene in the video content allows the camera to move in a given direction for a good amount time, e.g. a scene captured by a moving drone. This way an "immersive" video experience can be provided to the viewer. This means that a scene world as a function of time is not a small closed 3D geometry like a cube (as may be the case when using a static 360 camera). On the contrary, the scene world may include at least two vertical planes ("walls") on the left and right parallel to the camera motion and two horizontal planes top and bottom, "sky" and "ground" respectively. In some cases, such as large indoor warehouse, the world scene may be further simplified and can be characterized by only two planes, top and bottom. In yet another case, e.g. outdoor footage, the top plane (sky) can be considered at an infinite distance from the camera and thus can be omitted.

It is well known that in case of translational camera motion, there is a corresponding change in the images captured by the camera. If a camera moves with a certain velocity, a point of a 3D scene world imaged on the image plane of a camera can be assigned a vector indicating a magnitude and direction of the movement of the point on the image plane due to camera movement. The collection of the motion vectors for each point (e.g. pixel or collection of pixels such as a video block) in a video frame may form a motion vector field associated with the video frame. The motion vector field thus forms a representation of 3D motion as it is projected onto a camera image wherein the 3D motion causes a (relative) movement between (parts of) the real-world scene and the camera. The motion vector field can be represented as a function which maps image coordinates to a 2-dimensional vector. The motion fields in projected spherical video due to translational movement of a 360-video camera will exhibit a motion field of a distinct pattern depending on the type of projection that is used to project spherical video onto a rectangular 2D plane. FIG. 4A-4F illustrates the concept of motion fields in projected spherical video data in more detail.

Figure 4A:
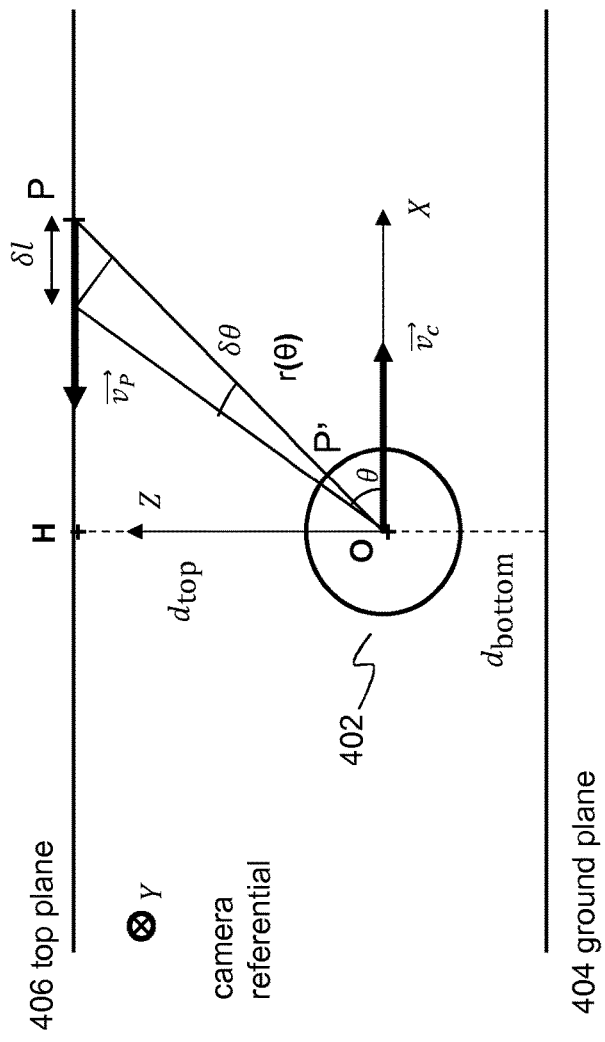
FIG. 4A-4F illustrates the concept of motion fields in projected spherical video data.
Figure 4B:
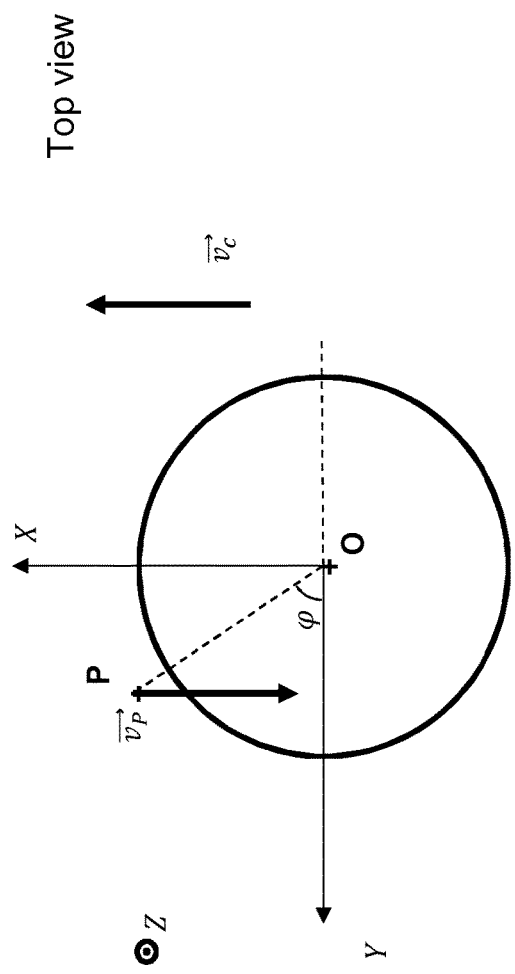

FIG. 4A depicts a side-view of a plane world scene model of a linear moving 360 video camera (i.e. a camera that has a hypothetical spherical capturing surface). FIG. 4B depicts a top-view of the plane world scene model. As shown in FIG. 4A, the spherical surface 402 of the 360 camera, which captures the scene, is schematically depicted as a sphere of radius r. Translational camera movements are typically caused by a displacement of the camera support, e.g. a car, a man, a drone, etc. In this situation, a scene may be modelled as two planes, a ground plane 404 (the "ground") and a top plane 406 (the "sky"). Here, the terms sky and ground determine the top and bottom planes (but do not necessarily represent a real-world "sky" or a real-world "ground"). For instance, the sky may represent a ceiling in an indoor 360 video. The scene may be further characterised by one or more distances, e.g. ground distance $d_{bottom}$ and sky distance $d_{top}$, which define the distance between the camera centre O and the ground plane (bottom plane) and the distance between the camera centre and the sky plane (top plane) respectively. If point P represents a point of the top plane, the speed of the point P is given by:

$$v_P = \frac{dx_P}{dt}$$

In addition, the trigonometric relationship in the triangle OPH gives:

$$\sin \theta = \frac{d_{top}}{r}$$

$$r = \frac{d_{top}}{\sin \theta}$$

and $$\cos \theta = \frac{x_P}{r}$$

Here, by definition angle $\theta$ for all the points of the top plane is within the range $[0; \pi]$ since $d_{top} \neq 0$. The motion visible on the sphere surface is given by an angular velocity of the point P' intersecting the sphere and the segment OP. Within the frame of reference of the camera, point P, i.e. point P is associated with a non-zero motion vector. In order to determine a displacement of the point P' on the circle while point P moved by $\delta l$, a tangent equation (providing a relation between the position of point P and the angle $\theta$), may be evaluated:

$$\tan \theta = \frac{d_{top}}{x_P}$$

By deriving an equation with respect to the time, the following expressions of the motion field for the plane world scene may be derived ($d_{top}$ is kept constant with respect to time):

$$\frac{1}{\cos^2 \theta} \frac{d\theta}{dt} = -d_{top} \frac{\frac{dx_P}{dt}}{x_P^2}$$

$$\omega_P = -\frac{d_{top} \cos^2 \theta}{x_P^2} v_P$$

$$\omega_P = -d_{top} \frac{1}{r^2} v_P$$

$$\omega_P = -\frac{\sin \theta}{r} v_P$$

$$\omega_p = \frac{\sin - \theta}{r} v_P$$

These equations are valid when $\vec{v}_P$ and $\vec{v}_C$ are in the same plane OXZ, i.e. P is in the plane OXZ. When P is not in this plane, the point P can be defined in a spherical coordinate system by (r, $\theta$, $\varphi$) with $\varphi$ being the azimuth angle and $\theta$ the polar angle in the spherical coordinate system and O its origin. FIG. 4B depicts the angle $\varphi$. Further $\vec{v}_P$ can be defined in the Cartesian coordinate system as:

$$v_P = \begin{vmatrix} -v_C \\ 0 \\ 0 \end{vmatrix}$$

In the case P is not in the plane OXZ, then the previous equation can be generalized by substituting $v_P$ with the projection of $\vec{v}_P$ onto the line (HP) hence falling back in the case of $\vec{v}_P$ and $\vec{v}_C$ are aligned which is:

$$v_P = -v_C \sin \varphi$$

This expression provides a horizontal component (an x-component) of the motion field of an EPR projection due camera motion (see also FIG. 4D):

$$\omega_{P_x} = -\frac{\sin - \theta}{r} v_C \sin \varphi$$

In a similar way, the vertical y-component of the motion field can be determined. These expressions indicate that the motion field produced by translational motion in a plane world model is characterized by a specific set of properties and can be analytically modelled using a simple parametric function as described above. For the purpose of describing the invention, throughout this application the terms "parametric function" and "parametric algorithm" are used interchangeably. As will be shown in the figures, the motion field is either globally zero or characterized by a focus of expansion (an expansion point) and a focus of contraction (contraction point) which are separated by 180 degrees. Moreover, any flow that is present is parallel to the geodesics connecting a focus of expansion to a focus of contraction.

Figure 4C:
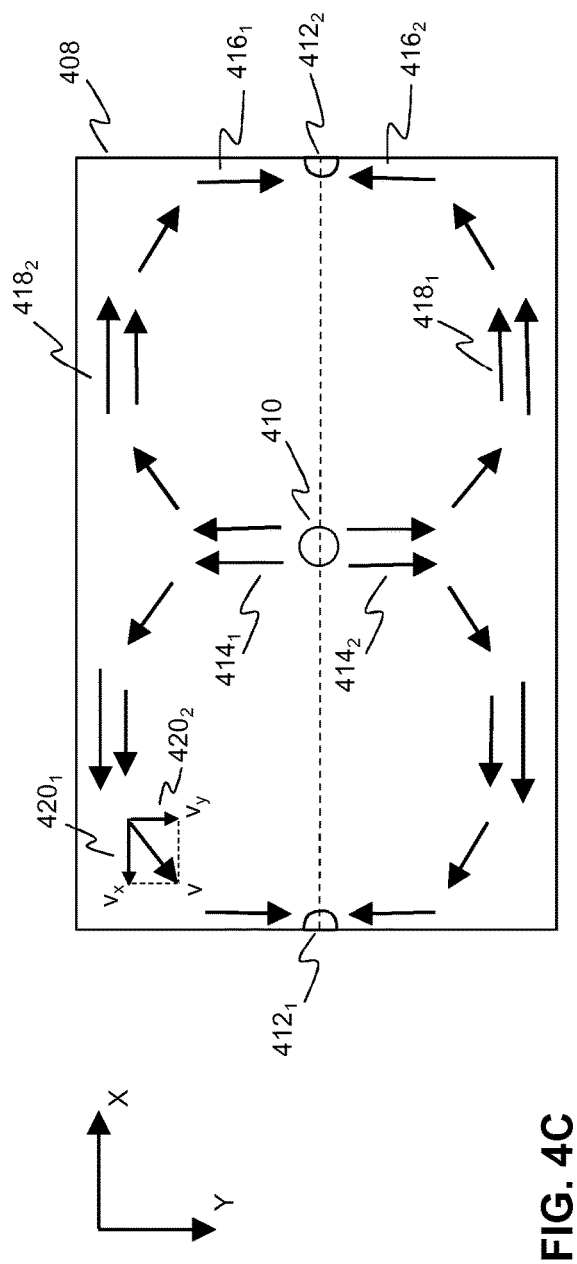

FIG. 4C represents a rectangular frame 408 matching the dimensions of video frames comprising spherical video data (pixels on a sphere) which are projected onto the rectangular frame using an equirectangular (ERP) projection. The projection introduces distortion (warping) around the poles (i.e. pixels at the upper and lower edge of the video frame), which is caused by the stretching that occurs at the poles to fit the projected sphere's surface onto the rectangular frame. Hence, a point on the sphere near a pole of the sphere has more pixels allocated in the projection, in this case an ERP projection, than a point at the equatorial area of the sphere. When a scene is captured by a 360 camera that generates ERP projected video frames, the pattern introduced by the projection may introduce a motion field that has a distinct motion pattern around the poles in the video.

For example, the motion field depicted in video frames as shown in FIG. 4C may be associated with a camera moving towards an object in the centre of the rectangular video frame. The motion field is caused by the nature of the 360-video capture and the projection, in this case an ERP projection, that is executed afterwards. If the 360-video is captured outside, the top part of the video will normally encompass the sky. In that case, the motion field is predominantly visible in the bottom part of the video. On the equator, the motion field is null by a linear translation of the camera parallel to the sky and ground. The centre point 410 in the pictures represent an expansion point, i.e. a point where motion fields $414_{1,2}$ point in opposite directions. The expansion point is the point to which the camera is moving. The point $412_{1,2}$ on the equator at the edge of the frame is called the compression point, i.e. a point where motion fields $416_{1,2}$ converge in a single point. In the example that the camera is moving forward, this part is behind the camera.

Figure 4D:
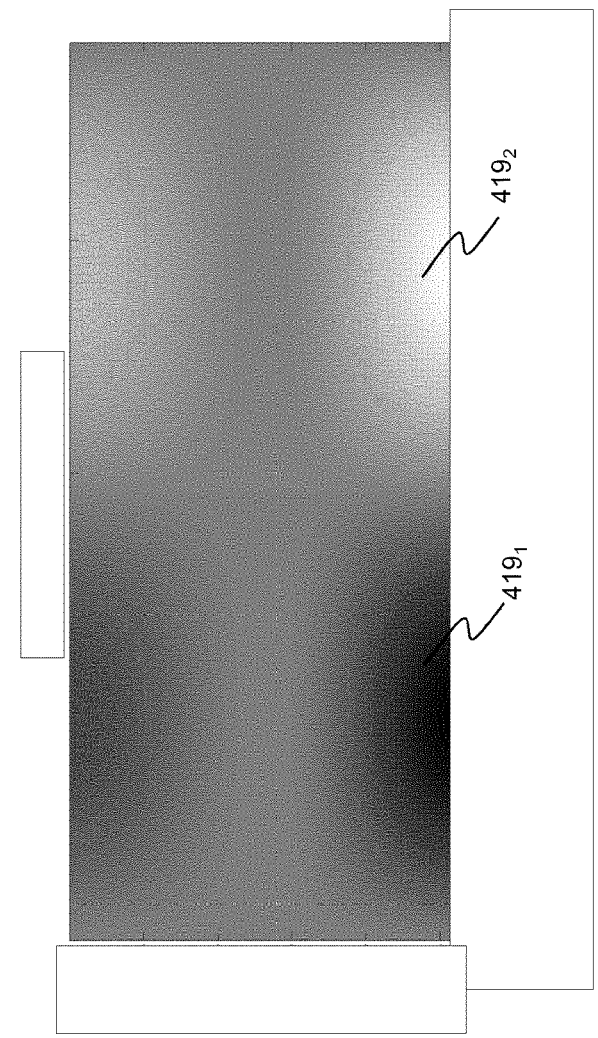

FIG. 4D provides a graphical representation of the x-component $\omega_{P_x}$ of the motion field of an EPR projection due to camera motion. The values are calculated on the basis of the above described mathematical expression for $\omega_{P_x}$. The concept of a motion field is closely related to the concept of motion vectors of a video frame as determined by a motion estimation process that is used in an inter-prediction scheme of a video coding system. As will be described hereunder in greater detail, in an inter-prediction scheme, motion vectors represent the position of a video block in a video frame based on the position of the same or similar video block in another video frame (a reference video frame). Motion in video will cause pixels of a video block in a video frame to shift from a first position in a first (projected) video frame to second position in a further second (projected) video frame. Thus, when applying a known motion estimation scheme to an EPR projected video frame, the motion vectors of video blocks of the projected video frame (as determined by the motion estimation scheme) will exhibit substantial variation (in magnitude and/or angle) in the areas where the motion field is strong. For example, the white areas $419_1$ and black areas $419_2$ represent areas in which the x-component of the motion field is relatively large.

The motion vector associated with a certain video block in a video frame represents a shift in (blocks of) pixels due to motion in the video, including motion caused by camera motion. Therefore, the motion field in a projected video frame (which can be accurately modelled) at the position of a video block provides an effective measure of the contribution of the camera motion to the motion vector. As shown in FIG. 4C, the contribution of the motion field to the motion vector can be divided in a contribution to a first motion vector component (the x component $420_1$ of the motion vector and a contribution to a second motion vector component (the y component $420_2$ of the motion vector).

Hence, in the white and black areas of FIG. 4D, the contribution of the camera motion to the motion vectors of the video blocks will be substantial. In contrast, grey areas of FIG. 4D identify areas in the video frame where the motion field is small so that little or negligible contribution of the camera motion to the motion vectors is to be expected. This way, the motion field in a projected video frame is used to determine which motion vectors of the video blocks are affected by camera motion and to what extend they are affected. Since the motion field has a characteristic predictable pattern for a certain projection type, the motion field can be used to improve the video compression.

Figures 4E, 4F:
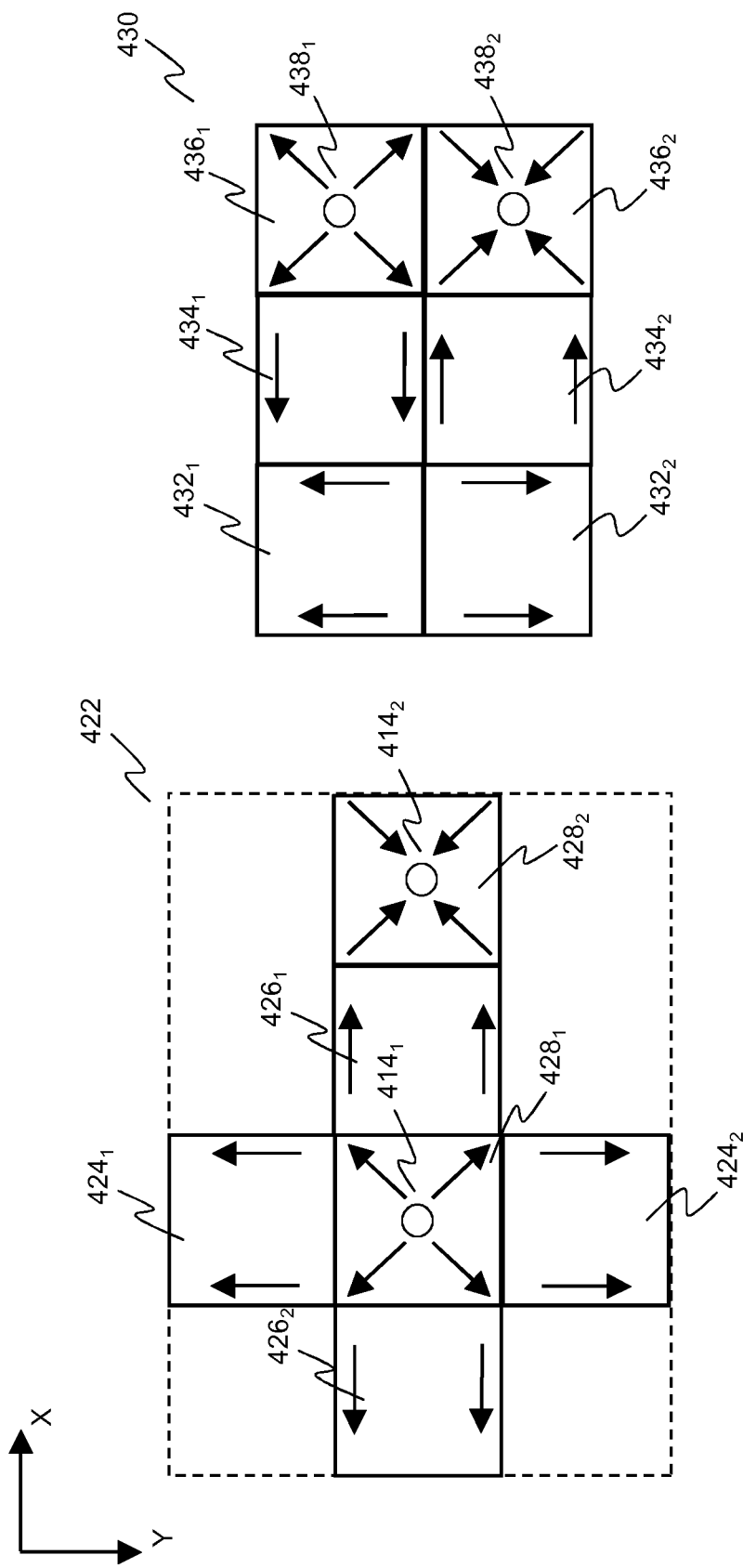

Although the effect of translational camera movement is explained above with reference to an ERP projection, the described effect, i.e. the distinctive pattern of the motion field, will also appear in other projections such as cube map. This is because each of these projections will introduce a characteristic pattern in the video. FIGS. 4E and 4F depict a projected video frame 422 and an associated packed projected video frame 430. The arrows show the directions of the motion field in the different pixel areas, including the pixel areas $428_{1,2}$ associated with the front and back face of the (virtual) cube. The pixel area associated with the front face may include an expansion point, i.e. a point where motion fields point in opposite directions and the pixel area associated with the back face may include a compression point, i.e. a point where motion fields converge in a single point. The pixel areas may further include pixel areas $426_{1,2}$ associated with the left and right face of the (virtual) cube and the pixel areas $424_{1,2}$ associated with the up and down face of the (virtual) cube. When packing the projected video frame, the pixel areas may be rearranged as depicted in FIG. 4D, including pixel areas $432_{1,2}$ associated with up and down, pixel areas $434_{1,2}$ associated with left and right and pixel areas $436_{1,2}$ associated with front and back faces of a (virtual) cube that was used as a projection model. As shown in FIGS. 4E and 4F, motion may cause complex but distinct motion fields in the video frames that depend on the way the pixel areas are arranged in the video frames. Hence, a particular arrangement of pixel areas in projected video frames is associated with a particular distinct (complex) motion field in the video.

Projected video frames that include motion fields due to a moving camera need to be encoded by a state of the art video coding system, e.g. HEVC, AV1, VP10, etc., These video coding systems rely on inter-prediction techniques in order to increase the coding efficiency. These techniques rely on temporal correlations between video blocks in different video frames, wherein the correlation between these blocks can be expressed on the basis of a motion vector. Such motion vector provides an offset of a video block in a decoded picture relative to the same video block in a reference picture (either an earlier video frame or a further video frame). For each video block in the video frame a motion vector can be determined. The motion vectors of all video blocks of a video frame may form a motion vector field. When examining the motion vector field of projected video frames, e.g. video frames comprising ERP or cubic projected video, the motion field at a position of a certain video block provides a measure of the motion of the pixels of that block wherein the motion includes global motion due to translational camera movement as described with reference to FIG. 4A-4F.

Figure 5A:
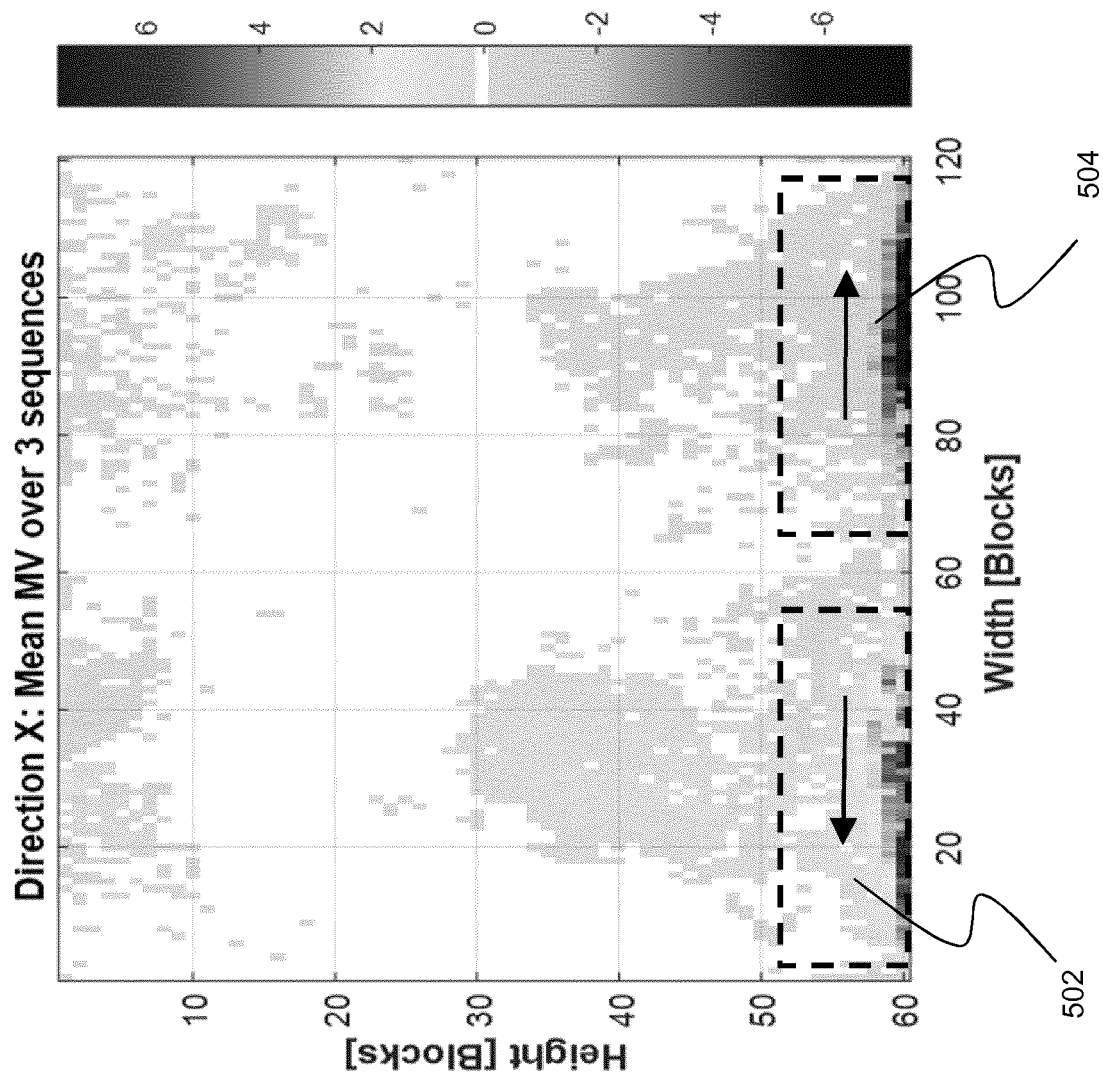
FIGS. 5A and 5B depict examples of time-averaged motion vector fields of 360 video frames.
Figure 5B:
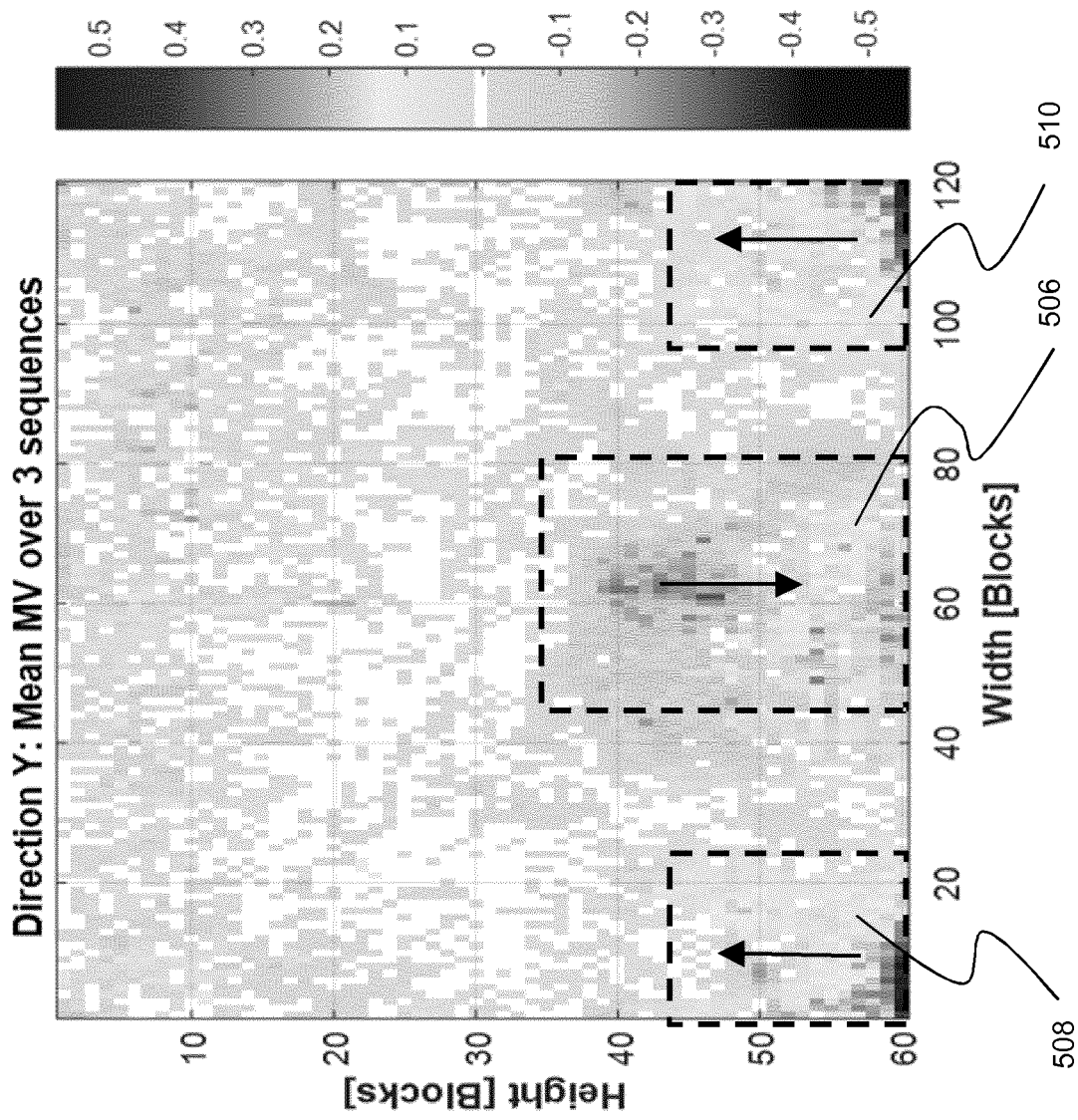

Experimental data of motion vector fields of decoded video frames is depicted in FIGS. 5A and 5B. In particular, FIG. 5A depicts a statistical analysis of the x-component of the motion vector fields of video frames of a video that was captured using a 360-video camera and FIG. 5B depicts a statistical analysis of the y-component of the motion vector fields of the video frames. The analysis was performed on a sequence of video frames with motion vectors comprising ERP projected spherical video. FIG. 5A depicts the horizontal component (X-direction) of the mean motion vector value which is calculated for each of the 60×120 blocks by averaging over 180 frames. The goal of the analysis was to verify whether similar 360 video frames (with centrally located camera moving forwards) exhibit the same characteristic features which can be used to improve the coding efficiency of a set of videos.

As shown in FIG. 5A, the mean MV values in the X direction show linear symmetry dominantly in the bottom part of the graph. As a centrally positioned 360 camera moves forward, the motion vectors 506 in FIG. 5B point downward from the centre of the picture (the expansion point) to the bottom edge. FIG. 5A shows that the motion vectors at the bottom parts of the image symmetrically point away from the centre to the right and left edges and FIG. 5B shows that the motion vectors at the left and right edge point upwards from the bottom edges toward the compression point. The relatively high mean MV values in areas 502 and 504 at the bottom left half and bottom right half of the X component show that MV values in these areas highly correlate with the horizontal (x-axis) components of the motion field of FIG. 4B. On the left bottom half of the X component 502 the mean value is positive as the motion vectors are dominantly oriented to the left, while on the right bottom half 504 the motion vectors are dominantly pointing to the right resulting in negative mean value for the MVs.

The mean MV values for the vertical, Y direction acquired for each of the 60×120 blocks by averaging over the motion vectors of the video frames are shown in FIG. 5B. This graph shows that the MV values highly correlate with the vertical (y-axis) components of the motion field of FIG. 4B, including vertical MV components 506 pointing towards the bottom in the centre of the graph and vertical MV components pointing upwards in the bottom corners 508 and 510.

Figures 6A, 6B:
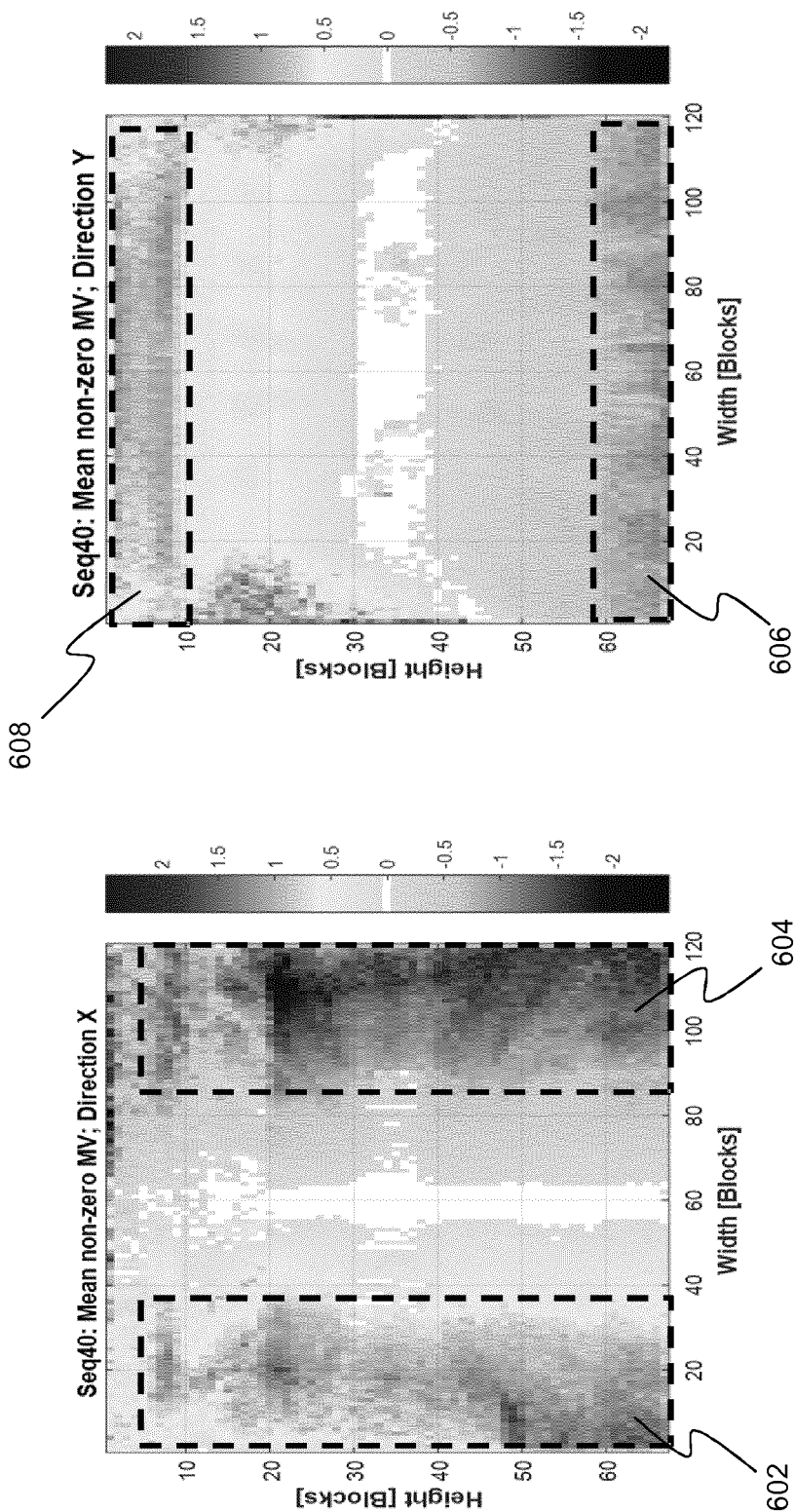
FIGS. 6A and 6B depict examples of time-averaged motion vector fields of 2D video frames.

The effect of camera motion causing a motion vector field of a distinct pattern in the video and affecting the direction and/or magnitude of the motion vectors determined by a motion estimation module of a video coding system not only occurs in spherical video but also in (conventional) 2D video. For example, FIGS. 6A and 6B depicts a statistical analysis of the X components of the motion vector field and Y components of the motion vector field of 2D video frames that include a zooming action, which can be regarded as a type of camera motion. As shown by FIG. 6A a dominant effect of the motion field in the horizontal MV values (horizontal MV values pointing to the left) at the left side of the graph is visible and a dominant effect of the motion field in the horizontal MV (horizontal MV values pointing to the right) at the right side of the graph is visible. Distinct MV patterns can also exist when the camera is moving (e.g. car moving forward).

Hence, from the statistical analysis of the motion vector fields as depicted in FIGS. 5A, 5B, 6A and 6B it follows that camera motion affects the magnitude and/or the direction of motion vectors of video blocks in video frames and introduces a characteristic global motion pattern, which can be accurately modelled and predicted using a parametric function as explained above. The characteristic global motion pattern that is introduced in the motion vector field by the movement of the camera will depend on the type of video (2D (conventional video) or spherical (such as omnidirectional video) and—in case of spherical video—the type of projection that is used for projecting the spherical video data onto a rectangular video frame as well as the world scene view, e.g. room, warehouse, outdoor, etc.

State of the art video coding systems such as HEVC, VP9 and AV1, use inter-prediction techniques to reduce the temporal redundancy in a sequence of video pictures in order to achieve efficient data compression. Inter-prediction uses a motion estimation technique to determine motion vectors (MVs), wherein a motion vector identifies a video block in a reference video frame that is suitable for predicting a video block in a current video frame that needs to be encoded. The difference between a predictive video block and a current video block may define a residual video block, which can be encoded together with metadata, such as the MV and transmitted to a video playout device that includes a video decoder for decoding the encoded information using the metadata. MVs may be further compressed by exploiting correlations between motion vectors. Translational moving objects in video pictures typically cover many blocks that have similar motion vectors in directions and length. Video coding standards typically exploit this redundancy.

For example, HEVC uses a so-called Advanced Motion Vector Prediction (AMVP) algorithm which aims to improve compression by using motion vectors that have already been calculated as references for predicting a current motion vector. In this scheme, a motion vector predictor (MVP) for a block may be generated by determining candidate motion vectors of already encoded blocks of the current video frame or co-located blocks of an decoded reference video frame and selecting a candidate motion vector as the best predictor for the current block based on an optimization scheme such as a well-known rate distortion and optimization (RDO) scheme. The motion vector difference MVD between the motion vector predictor and the motion vector and information about the selected motion vector predictor is entropy coded into a bitstream. The decoder uses the information of the selected motion vector predictor and the motion vector difference to reconstruct a motion vector of a block that needs to be decoded.

A problem associated with inter-prediction algorithms used by most coding standards is that these inter-prediction algorithms are based on the assumption that the motion relates to translational movement of objects in the video, which is sometimes referred to as local motion compensation. Motion vectors however provide an estimate of all motion in video blocks of a video frame, including local motion associated with moving objects and global motion associated with a moving background caused by a moving camera. Conventional inter-prediction schemes are optimized for local motion when the spatial correlation between motion vectors is an identity function, i.e. neighbour motion vectors tend to have the same amplitude and direction but they are not designed to deal with global motion effects with a non-uniform motion field, especially in cases where global motion effects are dominant, such as cases where 360-video is captured by a moving camera. The embodiments in this application aim to solve this problem by compensating global motion effects during the coding process. The invention relies on the fact that global motion effects due to camera movement introduce a distinct pattern in video frames which can be accurately modelled using a parametric function (parametric algorithm).

Figure 7A:
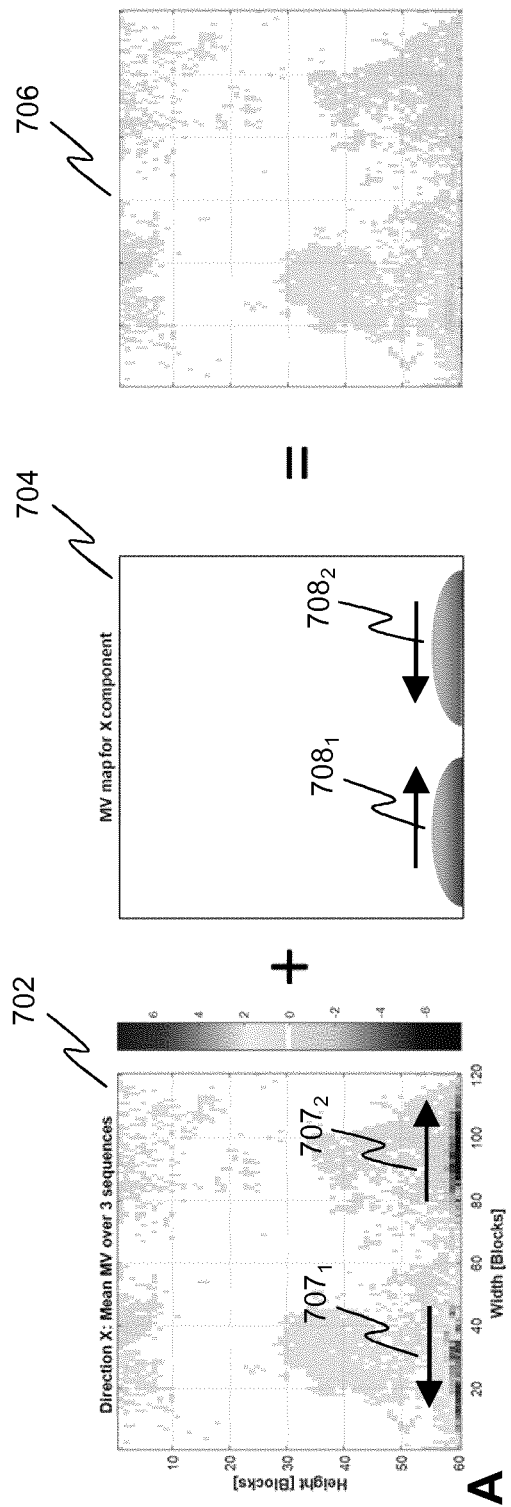
FIGS. 7A and 7B illustrate a motion compensation process for video coding according to an embodiment of the invention.
Figure 7B:
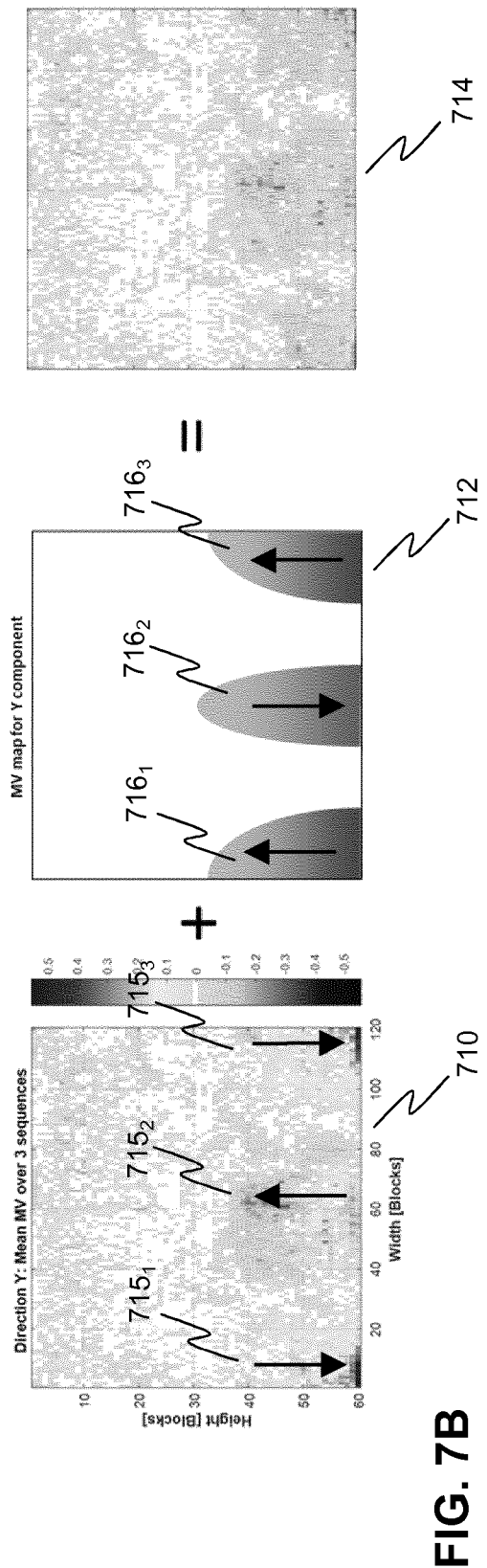

The general concept of the invention is schematically depicted in FIGS. 7A and 7B. The first graphs 702 and 710 of FIGS. 7A and 7B respectively depict a mean value of the X and Y component respectively of the averaged motion vector field of a sequence of video frames (as discussed with reference to FIG. 5). The motion vector components show distinct patterns that originate from an equirectangular projection of spherical video data onto a rectangular area (of a video frame) wherein the spherical video data is captured by a moving camera. These distinct patterns strongly correlate with the motion field of the simple plane world model as described with reference to FIGS. 4A and 4B. Hence, these figures show that experimentally determined motion vector fields of a particular video type (e.g. 2D or 360 video) and projection type (e.g. ERP or cubic projection) exhibit distinct patterns in the MV field, which cannot be efficiently handled by a conventional inter-prediction scheme which is based on the presumption that spatially neighbouring video blocks in video frames that include motion have motion vectors of approximately the same magnitude and direction. When global motion is introduced into the video this presumption is no longer valid thereby causing a substantial decrease in the compression efficiency of known video coding standards.

To counter the problem of the global motion, a simple parametric function (parametric algorithm) is used that provides an accurate estimate of the global motion of video blocks in video frames. The parametric function may depend on the projection model and camera parameters, e.g. translational velocity of the camera, camera height, etc. and produces motion compensation information that can be used to remove global motion from motion vectors or motion vector predictors that are used by the inter-prediction scheme to compress the video. For each block, the parametric function may determine a motion compensation vector, wherein the x-component provides an estimate of the global motion in the x-direction and the y-component an estimate of the global motion in the y-direction. The motion compensation vectors, one for each video block or groups of video blocks in a video frame, may be organized in a rectangular grid, which may be referred to as a motion compensation map. The motion compensation vectors can be easily approximated using a parametric function of the type of described with reference to FIGS. 4A and 4B. A motion compensation map may include two submaps, e.g. comprising one of the spatial components, e.g. X components or Y components. For example, as shown in FIG. 7A, a first motion compensation submap 704 (second graph of FIG. 7A) may include values for compensating the global motion in blocks of a video frame in a first direction (e.g. in the X direction) and a second motion compensation submap 712 (second graph of FIG. 7B) may include values for compensating the global motion field in a second direction (e.g. in the Y direction).

Hence, when the x-components of the first motion compensation submap are applied (e.g. added and/or subtracted) to the x-components of the MVs (first graph of FIG. 7A), compensated values of the MV field 706 in the x-direction can be achieved (the third graph 706 of FIG. 7A). As shown in FIG. 7A, the values of the MV field in the x-direction include two areas that are strongly affected by global motion, a first area of video blocks $707_1$ in which the x-components have a relatively large negative value (symbolically illustrated by a large arrow pointing to the left) and a second area of video blocks $707_2$ in which the x-components have a relatively large positive value (symbolically illustrated by a large arrow pointing to the right). In order to counter the effect of global motion, for each block of the video frame an estimate of the global motion (in terms of an x-component and an y-component) may be computed by a parametric function that models the global motion in video captured by a moving camera. The computed motion compensation map comprising the x-components of the global motion includes two areas $708_{1,2}$ that coincide with the first and second area $707_{1,2}$ of the measured x-components of the MV field. The computed x-components of the global motion field can be used to remove the x-component of the global motion in the x-components of the MVs, resulting in x-components of MVs 706 from which the global motion is removed. In a similar way, y-components of MVs can be compensated. The compensated MV field no longer includes global motion so that compensated MVs can be efficiently processed by a motion compensation technique of a regular video coding scheme.

Figure 8:
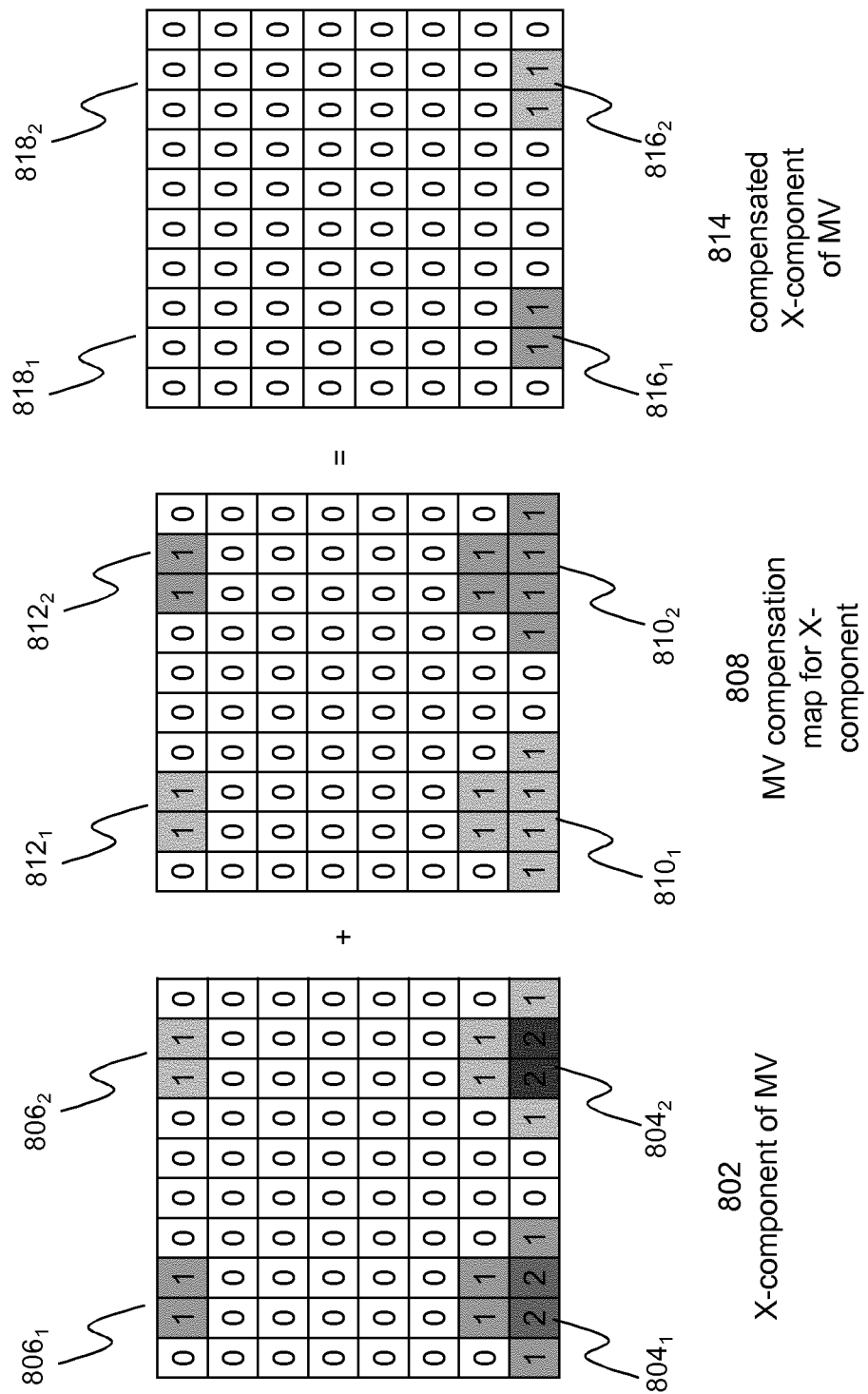
FIG. 8 illustrates a motion compensation process using a motion vector compensation function according to an embodiment of the invention.

FIG. 8 shows a schematic of the global motion compensation process according to an embodiment of the invention. An field 802 of MVs associated with video blocks of a video frame may include areas $804_{1,2}$, $806_{1,2}$ wherein the MVs are affected by a motion field in spherical video caused by e.g. a moving camera. A conventional inter-prediction scheme will not be able to efficiently process such motion vector correlation resulting in a substantial reduced motion vector coding efficiency. Based on camera parameters, a parametric function provides a simple model for determining a relatively accurate estimate of the global motion field e.g. a planar world model as described with reference to FIGS. 4A and 4B. Camera parameters that can be used for estimating global motion may include: camera height, sky height, camera direction and camera velocity.

On the basis of the planar world model, a motion compensation map 808 may be constructed which comprises motion compensation vectors $810_{1,2}$, $812_{1,2}$ which—when applied to the motion vectors of the MV field—results in a compensated MV field 814 in which the global motion in the areas $816_{1,2}$, $818_{1,2}$ are removed or at least substantially reduced.

It can be experimentally proven that the entropy of the compensated MV field is lower than the entropy of the original, non-compensated MV field. The reduced entropy will result in improved motion vector compression. An estimate of the entropy of the MV field may be based on the variance of motion vector components, which may be calculated in the following way:

$$\mu = \sum_j \sum_i p_i x_{ij}$$

$$\text{variance} = \sum_j \sum_i p_i (x_{ij} - \mu)^2$$

wherein $\mu$ is the average value of the motion vector components of the video blocks in a video frame. Here, $x_{ij}$ represents the motion vector value in the X direction of video block i,j and $p_i$ represents the weight associated with the motion value of video block i,j. In this case, the weight of video blocks in a video frame is simply 1/N wherein N is the number of video blocks in a video frame. The variance may be calculated using $\mu$, $x_{ij}$ and $p_i$. Hence, reduction of the value of the variance of the MV components of a MV field after the application of the MV compensation map may indicate that a video frame may be compressed more efficiently.

The main insight of the solution depicted in FIG. 7A, 7B and FIG. 8 is that motion vectors associated with video frames of a video, e.g. a 2D video or a 360 video, which comprises global motion, e.g. because it is captured with a moving camera, causes a distinct, characteristic pattern in the MV field. This pattern (the spatial correlations) may depend on the type of video (2D or spherical), the projection model used for projecting spherical video data onto a rectangular 2D video frame and camera parameters. For example, in case of ERP projected video, MVs (in particular x and/or y components of the MVs) tend to be much larger and of opposite direction at compression and expansion points in the video frames. The spatial correlations between these non-homogeneous MVs in these areas cannot be efficiently compressed using the state-of-the-art video coding systems. The embodiments in this application compensate the influence of the global motion field using a motion compensation vector for each block. These motion compensation vectors may be generated using a parametric function. This way, for a given motion vector, the x-component of the motion compensation vector can be used to compensate for global motion in the x-component of the motion vector and the y-component of the motion vector compensation vector can be used to compensate for global motion in the y-component of the motion vector. The motion compensation values are configured to eliminate the heterogeneously in the MV field caused by global motion. The thus generated compensated MV field comprises motion vectors associated with local motion, which exhibits correlations that can be processed by a state-of-the art video coding standards. This way, less bits are required to encode MVs thereby yielding higher compression efficiency for video frames that include global motion.

Figure 9:
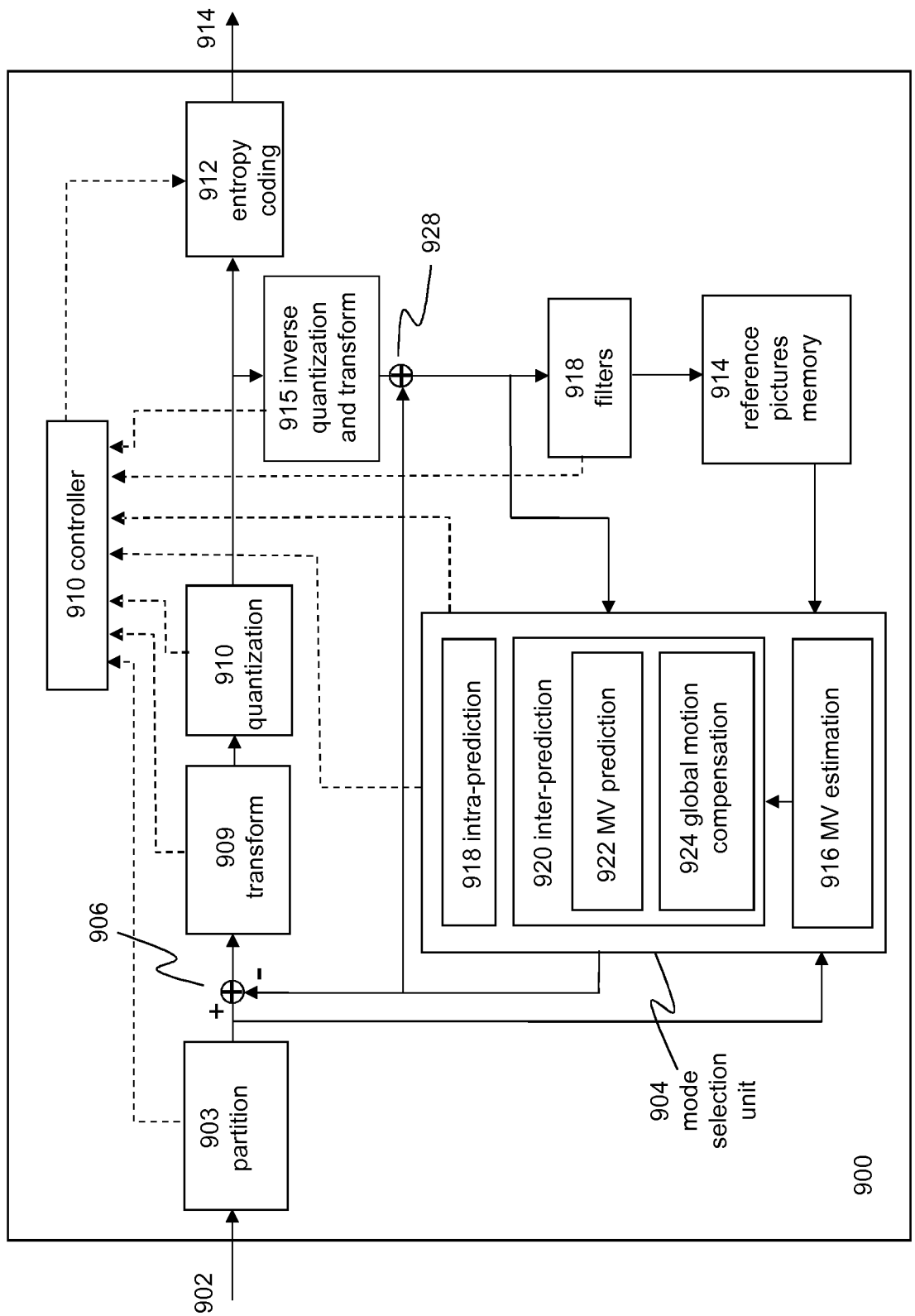
FIG. 9 illustrates an encoder apparatus comprising a motion compensation module according to an embodiment of the invention.

FIG. 9 is a block diagram illustrating a video encoder 900 including a motion compensation unit according to an embodiment of the invention. Video encoder 900 may perform intra- and inter-coding of video blocks within video frames or parts thereof, e.g. video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The video encoder receives video data 902 to be encoded. In the example of FIG. 9, video encoder 900 may include a partition unit 903, a mode select unit 904, summer 906, transform unit 908, quantization unit 910, entropy encoding unit 912, and reference picture memory 914. Mode select unit 904, in turn, may comprise a motion estimation unit 916, inter-prediction unit 920, and intra prediction unit 920. Inter-prediction unit may comprise a motion vector prediction unit 922 and a motion compensation unit 924. For video block reconstruction, video encoder 900 also includes inverse quantization and transform unit 915, and summer 928. A filter, such as a deblocking filter 918 may also be included to filter-out artefacts from the reconstructed video frames. Additional loop filters (in loop or post loop) may also be used in addition to the deblocking filter.

The mode select unit 904 may select one of the coding modes (e.g. intra-prediction or inter-prediction modes based on error results of an optimization function such as a rate-distortion optimization function), and provides the resulting intra- or inter-coded block to summer 906 to generate a block of residual video data (a residual block) to summer 928 to reconstruct the encoded block for use as a reference picture. During the encoding process, video encoder 900 receives a picture or slice to be coded. The picture or slice may be partitioned into multiple video blocks. An inter-prediction unit 920 in the mode selection unit 904 may perform inter-predictive coding of the received video block relative to one or more blocks in one or more reference pictures to provide temporal compression. Alternatively, an intra-prediction unit 918 in the mode selection unit may perform intra-predictive coding of the received video block relative to one or more neighbouring blocks in the same picture or slice as the block to be coded to provide spatial compression. Video encoder may perform multiple coding passes, e.g., to select an appropriate coding mode for each block of video data.

The partition unit 903 may further partition video blocks into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). The partitioning unit may further produce a quadtree data structure indicative of partitioning of an LCU into sub-CUs. Leaf-node CUs of the quadtree may include one or more PUs and one or more TUs.

The motion vector estimation unit 916 executes a process of determining motion vectors for video blocks. A motion vector, for example, may indicate a displacement Dx,Dy of a predictive block (a prediction unit or PU) of a video block within a reference picture (or other coded unit) relative to the current block being coded within the current picture (or other coded unit). Motion estimation unit calculates a motion vector by comparing the position of the video block to the position of a predictive block of a reference picture that approximates the pixel values of the video block. Accordingly, in general, data for a motion vector may include a reference picture list (i.e. a list of already decoded pictures (frames) stored in the memory of the encoder apparatus), an index into the reference picture list, a horizontal (x) component and a vertical (y) component of the motion vector. The reference picture may be selected from one or more reference picture lists, e.g. a first reference picture list, a second reference picture list, or a combined reference picture list, each of which identify one or more reference pictures stored in reference picture memory 914.

MV motion estimation unit 916 may generate and send a motion vector that identifies the predictive block of the reference picture to entropy encoding unit 912 and the inter-prediction unit 920. That is, motion estimation unit 916 may generate and send motion vector data that identifies a reference picture list containing the predictive block, an index into the reference picture list identifying the picture of the predictive block, and a horizontal and vertical component to locate the predictive block within the identified picture.

Instead of sending the actual motion vector, a motion vector prediction unit 922 may predict the motion vector to further reduce the amount of data needed to communicate the motion vector. In that case, rather than encoding and communicating the motion vector itself, motion vector prediction unit 922 may generate a motion vector difference (MVD) relative to a known (or knowable) motion vector. The known motion vector, which may be used with the MVD to define the current motion vector, may be defined by a so-called motion vector predictor (MVP). In general, to be a valid MVP, the motion vector being used for prediction points to the same reference picture as the motion vector currently being coded. Otherwise, further processing of the motion vector is required to be a valid MVP, component clipping, interpolation, etc. . . . . .

The motion vector prediction unit 922 may build a MVP candidate list that includes several neighbouring blocks in spatial and/or temporal directions as candidates for a MVP. When multiple MVP candidates are available (from multiple candidate blocks), MV prediction unit 922 may determine a MVP for a current block according to predetermined selection criteria. For example, MV prediction unit 922 may select the most accurate predictor from the candidate list based on analysis of encoding rate and distortion (e.g., using a rate-distortion cost analysis or other coding efficiency analysis). Other methods of selecting a motion vector predictor are also possible. Upon selecting a MVP, MV prediction unit may determine a MVP index, which may be used to inform a decoder apparatus where to locate the MVP in a reference picture list comprising MVP candidate blocks. MV prediction unit 922 may also determine the MVD between the current block and the selected MVP. The MVP index and MVD may be used to reconstruct the motion vector of a current block. Typically, the partition unit and mode selection unit (including the intra- and inter-prediction unit), the motion vector estimation unit and the motion compensation unit may be highly integrated. These units are illustrated separately in the figures for conceptual purposes.

The inter-prediction unit 920 may comprise a global motion compensation unit 924 comprising a global motion compensation function f configured to generate motion compensation information for removing global motion from the x and y components of motion vector predictors. For example, the x and y component of a motion vector predictor MVP=(D'x,D'y) associated with a block in a video frame describes the motion associated with pixels in that block. This motion may include local motion, global motion or both local and global motion. The function may be configured to determine an accurate estimation of the global motion in blocks of a video frame. In an embodiment, such estimate may be in the form of a motion compensation vector MCV=(dx,dy), which can be used to remove the global motion components from a motion vector or a motion vector predictor before the encoder determines an optimal motion vector difference MVD based on an optimization scheme (e.g. rate distortion optimization (RDO) scheme which is described below in more detail).

In an embodiment, the global motion may be removed by subtracting the x and y component of the global motion vector from the x and y component of the motion vector predictor. The resulting motion vector predictor may be referred to as a compensated motion vector predictor CMVP=(D'x−dx,D'y−dy) respectively. The CMVP may then be used by the encoder to determine an optimal motion vector difference. This way, negative effects on the compression of the motion vectors caused by global motion may be substantially reduced.

In an embodiment, the motion vector predictor MVP may be compensated based on a motion compensation vector and the resulting global motion compensated motion vector predictor CMVP may be used to determine a motion vector difference MVD. To that end, the encoder may use motion compensation vectors generated by the global motion compensation function f to compensate motion vector predictor candidates as defined in a candidate list MVP[i] generated by MV prediction unit 922. This way a candidate list of compensated motion vector predictor candidates CMVP[i] may be determined f: MVP[i]→CMVP[i]. A rate distortion optimization process may be used to select the best candidate from the candidate list of compensated motion vector predictor candidates CMVP[i]. The selection may be signalled as an index of the candidate list, e.g. i=0 if CMVP[0] is selected by the RDO process. The MV prediction unit thereafter determines a MVD as CMVP[0]—MV and the MVD and the index are subsequently coded into a bitstream. In an embodiment, also one or more non-compensated motion vector predictors from the candidate list of (non-compensated) motion vector predictors MPV[i] may be taken into account during the RDO process. This way, compensation of the global motion is only used if it provides an improvement in the RD costs.

Processes executed by the motion compensation unit of the encoder will be described hereunder in more detail with reference to FIG. 11-13.

A residual video block may be formed by an adder 906 subtracting a predicted video block (as identified by a motion vector) received from mode select unit 904 from the original video block being coded. The transform processing unit 909 may be used to apply a transform, such as a discrete cosine transform (DCT) or a conceptually similar transform, to the residual video block in order to form a block of residual transform coefficient values. Transforms that are conceptually similar to DCT may include for example wavelet transforms, integer transforms, sub-band transforms, etc. The transform processing unit 909 applies the transform to the residual block, producing a block of residual transform coefficients. The transform may convert the residual information from a pixel value domain to a transform domain, such as a frequency domain. Transform processing unit 909 may send the resulting transform coefficients to a quantization unit 910, which quantizes the transform coefficients to further reduce bit rate.

A controller 910 may provide syntax elements (metadata) of the encoding process, such as inter-mode indicators, intra-mode indicators, partition information, and syntax information, to entropy coding unit 914.

Here the syntax elements may include information for signalling (selected) motion vector predictors, motion vector differences and metadata associated with the motion compensation process as described in the embodiments of this application. This metadata may include an indication that the motion vector difference is based on a difference between the motion vector and a global motion compensated motion vector predictor. Such indication may be implemented as a (binary) flag or the like. This metadata may further include information for converting motion vector predictors into compensated motion vector predictors, e.g. parameters for a parametric algorithm (parametric function) in the video decoder, motion compensation vectors or information for building a motion compensation map comprising motion compensation vectors for compensating video blocks of video frames.

Entropy coding unit 912 entropy then encodes the quantized transform coefficients and the syntax elements. For example, entropy coding unit may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighbouring blocks. Following the entropy coding by entropy coding unit, the encoded bitstream may be transmitted to another device (e.g., a video decoder) or stored for later transmission or retrieval.

Inverse quantization and inverse transform unit 915 apply inverse quantization and inverse transformation, respectively, to reconstruct the residual block in the pixel domain, e.g., for later use as a reference block. Inter-prediction unit 920 may calculate a reference block by adding the residual block to a predictive block of one of the pictures of reference picture memory 914. Inter-prediction unit 920 may also apply one or more interpolation filters to the reconstructed residual block to calculate sub-integer pixel values for use in motion estimation. The reconstructed residual block is added to the motion prediction block produced by the inter-prediction unit 920 to produce a reconstructed video block for storage in reference picture memory 914. The reconstructed video block may be used by motion vector estimation unit 916 and inter-prediction unit 920 as a reference block to inter-coding a block in a subsequent picture.

The encoder may perform a known rate-distortion optimisation (RDO) process in order to find the best coding parameters for coding blocks in a picture. Here, the best coding parameters (including mode decision (intra-prediction; inter-prediction without motion compensation or inter-prediction with motion-compensation); intra prediction mode estimation; motion estimation; and quantization) refer to the set of parameters that provide the best trade-off between a number of bits used for encoding a block versus the distortion that is introduced by using the number of bits for encoding.

The term rate-distortion optimization is sometimes also referred to as RD optimization or simply "RDO". RDO schemes that are suitable for AVC and HEVC type coding standards are known as such, see for example, Sze et al. *"High efficiency video coding (HEVC)."* Integrated Circuit and Systems, Algorithms and Architectures. Springer (2014): 1-375; Section: 9.2.7 RD Optimization. RDO can be implemented in many ways. In one well-known implementation, the RDO problem can be expressed as a minimization of a Lagrangian cost function J with respect to a Lagrangian multiplier:

$$\lambda :: \min_{(coding\ parameters)} J = (D + \lambda * R).$$

Here, the parameter R represents the rate (i.e. the number of bits required for coding) and the parameter D represents the distortion of the video signal that is associated with a certain rate R. The distortion D may be regarded a measure of the video quality. Known metrics for objectively determining the quality (objectively in the sense that the metric is content agnostic) include means-squared error (MSE), peak-signal-to-noise (PSNR) and sum of absolute differences (SAD).

In the context of HEVC, the rate-distortion cost may require that the video encoder computes a predicted video block using each or at least part of the available prediction modes, i.e. one or more intra-prediction modes and/or one or more inter-prediction modes. The video encoder then determines a difference video signal between each of the predicted blocks and the current block (here the difference signal may include a residual video block) and transforms each residual video block of the determined residual video blocks from the spatial domain to the frequency domain into a transformed residual block. Next, the video encoder may quantize each of the transformed residual blocks to generate corresponding encoded video blocks. The video encoder may decode the encoded video blocks and compare each of the decoded video blocks with the current block to determine a distortion metric D. Moreover, the rate-distortion analysis involves computing the rate R for each encoded video block associated with of one of the prediction modes, wherein the rate R includes an amount of bits used to signal an encoded video block. The thus determined RD costs, the distortion D and the rate R of the encoded blocks for each of the prediction modes, are then used to select an encoded video block that provides the best trade-off between the number of bits used for encoding the block versus the distortion that is introduced by using the number of bits for encoding.

In an embodiment, the invention provides an encoding optimization scheme for video data based on an RD optimization scheme. The optimization scheme takes into account that:

1. motion in video blocks in video frames may comprise a global motion component caused by camera motion (e.g. a global motion field in spherical video data due to translational movement of the 360-camera, i.e. video data projected onto a 2D plane using a predetermined projection model such as an equirectangular or cubic projection model);
2. the motion field represented by MVs of video blocks in the video frames includes a global motion component that can be approximated (modelled) by a function or algorithm and one or more parameters associated with the moving camera, e.g. camera speed, camera direction, camera height, etc.

An initial global motion parameter set may be used by the function to determine initial motion vector compensation values for video blocks of a video frame. The motion vector compensation values for all video blocks of a video frame may be referred to as a motion vector compensation map. The initial global motion parameter set may be used to provide a first approximation of motion compensation values (a first candidate map) for each of at least part of the video blocks in a video frame. Then, a number of derived global motion parameters sets may be generated by introducing one or more small deviations in global motion parameters of the initial global motion parameter set. These different global motion parameter sets may be used to determine different motion compensation maps (one or more further candidate motion compensation maps). Each of these candidate motion compensation maps may be used to compensate (minimize) the contribution of the global motion field to the motion vector components of a video frame that needs to be encoded.

The candidate motion compensation map that provides the most accurate model of the motion field in a sequence of video frames may be used to remove or at least substantially reduce the global motion field from a motion vector or a motion vector predictor. This way an improved RD cost may be achieved when compared to the RD cost of the original video frame wherein the motion vectors are not compensated for the global motion field. This way the RD optimization scheme can be used to determine a global motion parameter set comprising motion vector compensation that provides the best coding efficiency.

Hence, the encoding optimization scheme according to the invention includes the generation of several candidate motion compensation maps. Each candidate map may be used to determine compensated motion vectors or compensated motion vector predictors associated with video blocks of a video frame. Here a compensated motion vector (predictor) represents a motion vector (predictor) in which contribution of the global motion field is eliminated or at least substantially reduced. Each candidate map may be used in a RD optimization process, e.g. a known RD optimization process, in which the conventional encoding parameters (intra-prediction, inter-prediction and motion compensation) are optimized per coding block using minimization of a cost function. The encoded candidate video frame that exhibits the lowest RD costs is used in the formation of the output bitstream that is generated by the encoder apparatus.

Figure 10:
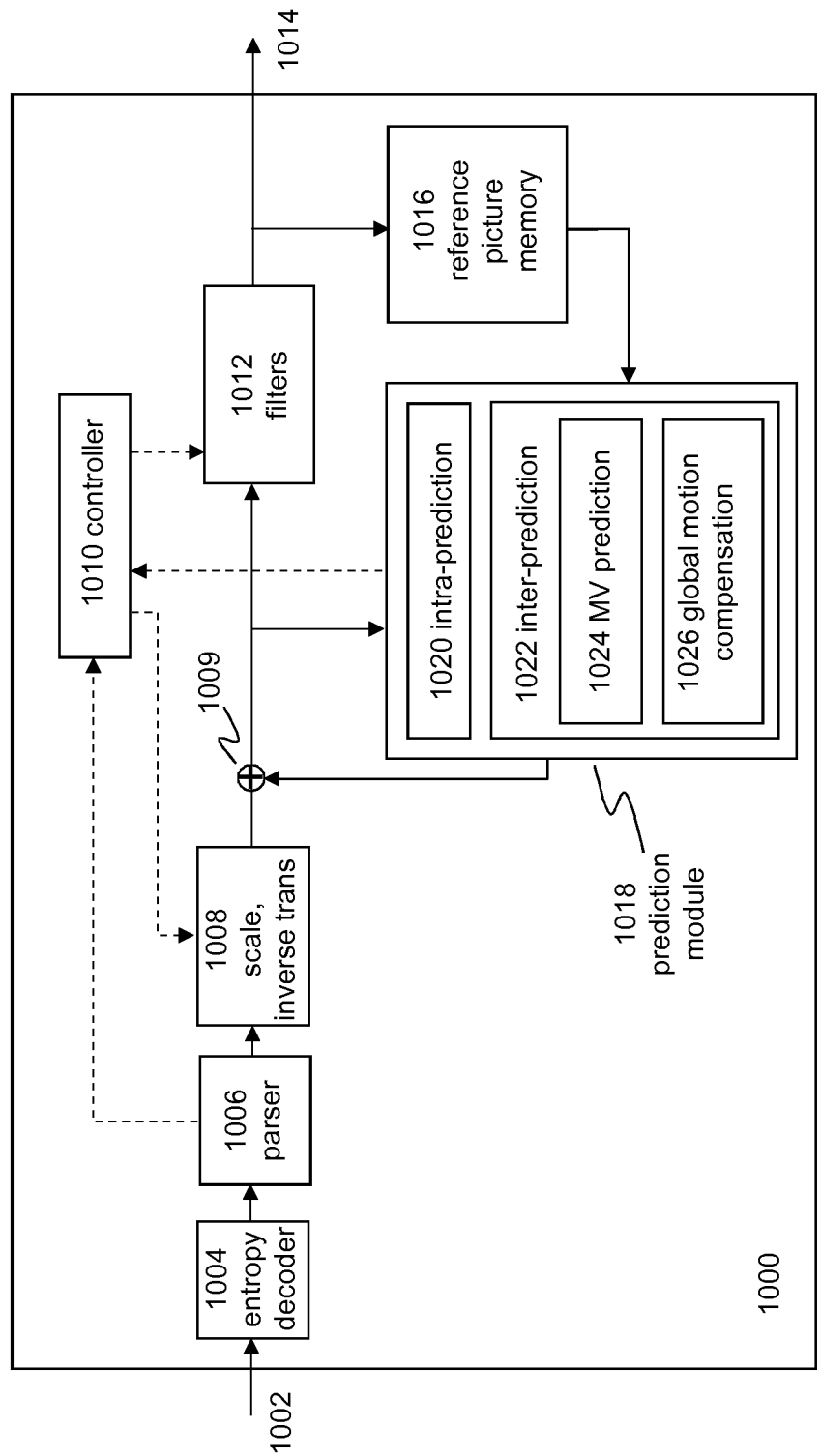
FIG. 10 illustrates a decoder apparatus comprising a motion compensation module according to an embodiment of the invention.

FIG. 10 is a block diagram illustrating an example video decoder 1000 that comprise a motion compensation unit according to an embodiment of the invention. In the example of FIG. 10, video decoder 1000 includes entropy decoding unit 1004, parser 1006, prediction unit 1018, inverse quantization and inverse transformation unit 1008, summer 1009, and reference picture memory 1016. Here, prediction unit 1018 may include an inter-prediction unit 1022 and intra-prediction unit 1020. Further, the inter-prediction unit may include a motion vector prediction unit 1024 and a global motion compensation unit 1026 comprising a motion compensation function. The motion compensation function may be a parametric algorithm (parametric function) for generating motion compensation information, e.g. motion compensation vectors, based on a model of a moving camera and one or more parameters associated with the model. Alternatively, the motion compensation function may be (or rely on) an image processing function configured to determine an estimate of global motion from blocks of a sequence of video frames.

During the decoding process, video decoder 1000 receives an encoded video bitstream 1002 that comprises encoded video blocks and associated syntax elements from a video encoder. Entropy decoding unit 1004 decodes the bitstream to generate quantized coefficients associated with residual blocks, motion vector differences, and syntax elements (metadata) for enabling the video decoder to decode the bitstream. Parser unit 1006 forwards the motion vector differences and associated syntax elements to prediction unit 1018.

The syntax elements may be received at video slice level and/or video block level. For example, by way of background, video decoder 1000 may receive compressed video data that has been compressed for transmission via a network into so-called network abstraction layer (NAL) units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

When video blocks of a video frame are intra-coded (I), intra-prediction unit 1022 of prediction unit 1018 may generate prediction data for a video block of the current video slice based on a signalled intra-prediction mode and data from previously decoded blocks of the current picture. When video blocks of a video frame are inter-coded (e.g. B or P), inter-prediction unit 1020 of prediction unit 1018 produces predictive blocks for a video block of the current video slice based on motion vector differences and other syntax elements received from entropy decoding unit 1004. The predictive blocks may be produced from one or more of the reference pictures within one or more of the reference picture lists stored in the memory of the video decoder. The video decoder may construct the reference picture lists, using default construction techniques based on reference pictures stored in reference picture memory 1016.

Inter-prediction unit 1020 may determine prediction information for a video block of the current video slice by parsing the motion vector differences and other syntax elements and using the prediction information to produce predictive blocks for the current video block being decoded. For example, inter-prediction unit 1020 uses some of the received syntax elements to determine a prediction mode (e.g., intra- or inter-prediction) which was used to code the video blocks of the video slice, an inter-prediction slice type (e.g., B slice or a P slice), construction information for one or more of the reference picture lists for the slice, motion vector predictors for each inter-encoded video block of the slice, inter-prediction status for each inter-coded video block of the slice, and other information to decode the video blocks in the current video slice. In some examples, inter-prediction unit 1020 may receive certain motion information from motion vector prediction unit 1022.

The inter-prediction unit 1020 may include global motion compensation unit 1024 comprising a motion compensation function for converting a compensated motion vector to a motion vector. In an embodiment, the motion conversion function may be a parametric algorithm (parametric function) for determining motion compensation vectors using on one or more parameters in the bitstream.

The decoder may retrieve a motion vector difference MVD for a current block that needs to be decoded. The decoder may further determine a candidate list of motion vector predictor candidates MVP[i] associated with the current block. The video decoder is capable of building the list based on the position of the current block wherein the motion vector predictor candidates are associated with blocks that have a predetermined position (typically neighbouring) relative to the position of the current block. These relative positions are known to the encoder and the decoder apparatus.

The decoder may then use the motion compensation function to generate motion compensation information to convert a motion vector predictor in a compensated motion vector predictor. For example, in one embodiment, the motion compensation function may be a parametric algorithm configured to generate motion compensation information on the basis of one or more parameters in the bitstream. The motion compensation information may include a motion compensation vector that was used by the encoder to compensate a motion vector predictor. In another embodiment, in case motion compensation vectors or (part of) a motion compensation map are/is coded into the bitstream, the motion compensation function may use a motion compensation vector in the bitstream to convert a MVP to a CMVP.

The decoder may further use the motion compensation vectors to determine a candidate list of compensated motion vector predictors CMVP[i]. The decoder may use a decoded index, i.e. i=0, associated with the motion vector difference MVD to select a compensated motion vector predictor CMVP[0] that was selected by the encoder and used to determine the MVD. The decoder then calculates a MV on the basis of the CMVP[0] and the MVD: MV=CMVP[0]−MVD. The thus reconstructed MV is subsequently used to determine a prediction block in a reference frame stored in the reference picture memory of the video decoder.

Processes executed by the motion compensation unit of the decoder will be described hereunder in more detail with reference to FIG. 11-13.

Thus, after determining motion information for the current block, motion vector prediction unit 1022 may generate the predictive block for the current block.

Inverse quantization and inverse transform unit 1008 inverse quantizes, i.e., de-quantizes, the quantized transform coefficients provided in the bitstream and decoded by entropy decoding unit. The inverse quantization process may include use of a quantization parameter calculated by video encoder for each video block in the video slice to determine a degree of quantization and, likewise, a degree of inverse quantization that should be applied. It may further apply an inverse transform, e.g., an inverse DCT, an inverse integer transform, or a conceptually similar inverse transform process, to the transform coefficients in order to produce residual blocks in the pixel domain.

After inter-prediction unit 1020 generates the predictive block for the current video block, the video decoder forms a decoded video block by summing a residual block determined by inverse transform process with the corresponding predictive block generated by inter-prediction unit 1020. The adder 1009 represents the component or components that perform this summation operation. If desired, a deblocking filter may also be applied to filter the decoded blocks to remove blocking artefacts. Other loop filters (either in the coding loop or after the coding loop) may also be used to smooth pixel transitions, or otherwise improve the video quality. The decoded video blocks in a given picture are then stored in reference picture memory 1016, which stores reference pictures used for subsequent motion compensation. Reference picture memory 1016 also stores decoded video for later presentation on a display device.

Figure 11:
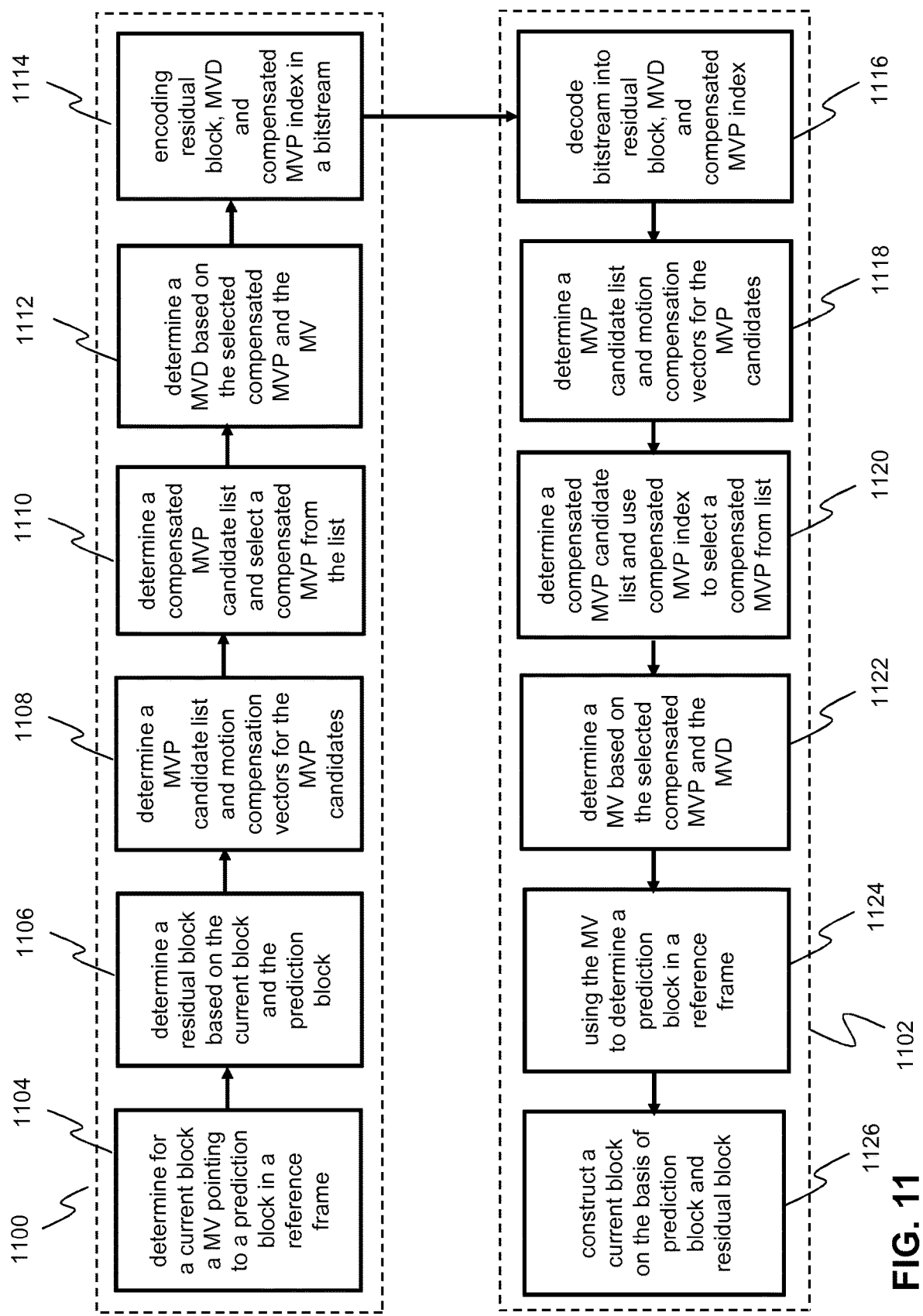
FIG. 11 shows a motion compensation process for video coding according to an embodiment of the invention.

FIG. 11 depicts a flow-chart of a video coding processes according to another embodiment of the invention. The process may be implemented as an encoding process 1100 executed by an encoder apparatus, e.g. an encoder apparatus as described with reference in FIG. 9, and a decoding process 1102 executed by a decoder apparatus, e.g. a decoder apparatus as described with reference to FIG. 10.

In a first step 1104, the encoder may determine a motion vector (MV) for a current video block that needs to be encoded. A well-known motion vector estimation process may be used to determine the motion vector wherein each motion vector may indicate the displacement (offset) of a video block within a current picture relative to a video block within a decoded reference picture stored in the memory of the encoder apparatus (e.g. a decoded video frame preceding or succeeding the current video frame). The video block in the reference frame the motion vector is pointing to may be referred to as a prediction block. Then, a residual video block may be determined based on a difference between the current block and the prediction block (step 1106). A residual block may be determined based on a difference of video samples (e.g. pixel values) in a video block in the current frame and a video block in a reference frame that is identified by a motion vector. In an embodiment, the video frames may be projected video frames, i.e. video frames generated by mapping spherical video onto a rectangular 2D frame using a projection model as e.g. described with FIGS. 2 and 3. A projected video frame may comprise an arrangement of pixel regions which are a direct consequence of the projection model that is used, wherein during the projection the image may be distorted (warped) due to the projection.

In a further step 1110, at least one list of motion vector predictor candidates may be determined by the encoder apparatus. The MVP list may be an indexed list of MVP candidates. The list of candidates may be generated using any suitable MV prediction process, e.g. an AMVP scheme known from the HEVC standard or the Dynamic Reference Motion Vector Prediction (REFMV) used by AV1. The process to produce the candidate list is both known to the encoder and decoder apparatus. Typically, the motion vector predictor candidates include motion vectors of already decoded blocks in a reference frame (typically blocks that are co-located with the current block) or motion vectors of already decoded blocks in the current frame (typically blocks neighbouring the current block). An optimization process, e.g. a rate-distortion optimization process, may be used to select an optimal motion vector predictor from the candidate list.

In step 1110 the encoder may use a function to determine an estimate of the contribution of the global motion field to motion vectors of a video frame. These motion contributions are linked to the camera motion (as e.g. described with reference to FIGS. 4A-4C) and, if spherical video data is projected on a 2D plane, warping effects that appear due to the projection. The function may generate compensation information, which may have the form of a motion compensation vector wherein the x-component of the motion compensation vector can be used to remove the global motion from an x-component of a motion vector predictor and the y-component of the motion compensation vector can be used to remove global motion from an y-component of a motion vector predictor. The motion compensation vectors may provide an accurate estimate of the global motion in a video frame. Compensated motion vector predictors may be generated by adding (subtracting) the motion compensation vectors to (from) the motion vector predictors. Such vector calculation may be simply executed by adding and/or subtracting the components of a motion vector predictor (e.g. the x and y components of a motion vector) and a motion compensation vector (step 1108).

In an embodiment, the function may be one or more parametric functions which is also known by the decoder apparatus. For a particular sequence of video frames, a parametric function may be selected by the encoder apparatus on the basis of a number of parameters, e.g.: type of video (e.g. spherical video and projection model (e.g. ERP or cubic). Further, one or more parameters such as camera speed, camera height, camera direction, etc. may be used to allow a parametric function to determine motion compensation vectors that provide an accurate estimate for the global motion in the sequence of video frames. In that case, the function type and the parameters are transmitted to the decoder apparatus that may use these parameters to reproduce the motion compensation vectors.

In another embodiment, the function may be an image processing function which is configured to determine motion vectors for blocks in video frames of the sequence of video frames and classify the motion vectors into motion vectors associated with local motion, i.e. moving objects, and global motion, i.e. motion of a scene that is caused by a moving camera. The motion vectors that represent global motion may be used as motion compensation vectors, which may be transmitted in the bitstream to the decoder apparatus. Hence, in that case, the decoder apparatus can directly use the motion compensation vectors and no parametric function is necessary.

The motion compensation information generated by the function may include motion compensation vectors for MVPs of the MVP candidate list. These motion compensation vectors may be applied to the MVP of the MVP candidate list to form a list, preferably an indexed list, of compensated MVP candidates. An optimization process, such as a rate-distortion optimization process may be used to select an optimal compensated MVP from the indexed list of compensated MVP candidates (end of step 1110).

The index of the selected compensated MVP may be referred to as the compensated MVP index. In step 1112 a MVD may be determined based on the selected compensated MVP and the MV of the current block. The residual block, the MVD (that is based on a compensated MVP) and the compensated MVP index and all other information (metadata) that is needed by the decoder apparatus to reconstruct the block is coded in a bitstream using entropy coding (step 1114).

A decoder apparatus receiving the bitstream may execute a process to decode the bitstream and construct video frames on the basis of the decoded information in the bitstream and decoded reference video frames stored in the reference picture memory of the decoder apparatus. To that end, the decoder apparatus may first use an entropy coding process to decode the bitstream into a residual video block, a MVD and metadata including a compensated MVP index (step 1116). Further, the decoder apparatus may determine a MVP candidate list and motion compensation vectors for the MVP candidates (step 1118).

In an embodiment, the decoder apparatus may determine motion compensation vectors based on a parametric function that is also used by the encoder apparatus. In that case, the metadata may include one or more parameters for the parametric function, wherein the parameters allow the function to provide an accurate estimate of the global motion of a sequence of video frames that includes the current video frame. Alternatively, the encoder apparatus may transmit the motion compensation vectors as metada in the bitstream to the decoder apparatus. In that case, the decoder apparatus does not need to calculate motion compensation vectors but can directly use the motion compensation vectors in the bitstream.

The motion compensation vectors may be used to determine a list of compensated MVP candidates and the compensated MVP index may be used to selected a compensated MVP from the candidate list (step 1120). In an embodiment, instead of determining compensated MVP for all candidates in the candidate list, the compensated motion vector index may be used to determine a motion compensation vector for the MVP candidate as identified by the compensated MVP index and apply the motion compensation vector to the MVP candidate in order to form the compensated MVP.

A MV of the current block may be determined on the basis of the compensated MVP and the decoded MVD (step 1122). Further, decoder apparatus may use the MV to determine a prediction block in a reference frame stored in the memory of the decoder apparatus (step 1124) and reconstruct a current block based on the prediction block and the decoded residual block (step 1126).

Hence, as shown by the process of FIG. 11, motion compensation information is used to eliminate or at least substantially reduce global motion from motion vector predictors. Removing the global motion from the motion vector predictors, a state-of-the-art motion vector prediction scheme can be used to efficiently generate motion vector differences that have a lower entropy than the original non-compensated motion vector differences. This way efficient compression of high resolution video that includes global motion can be achieved.

Figure 12:
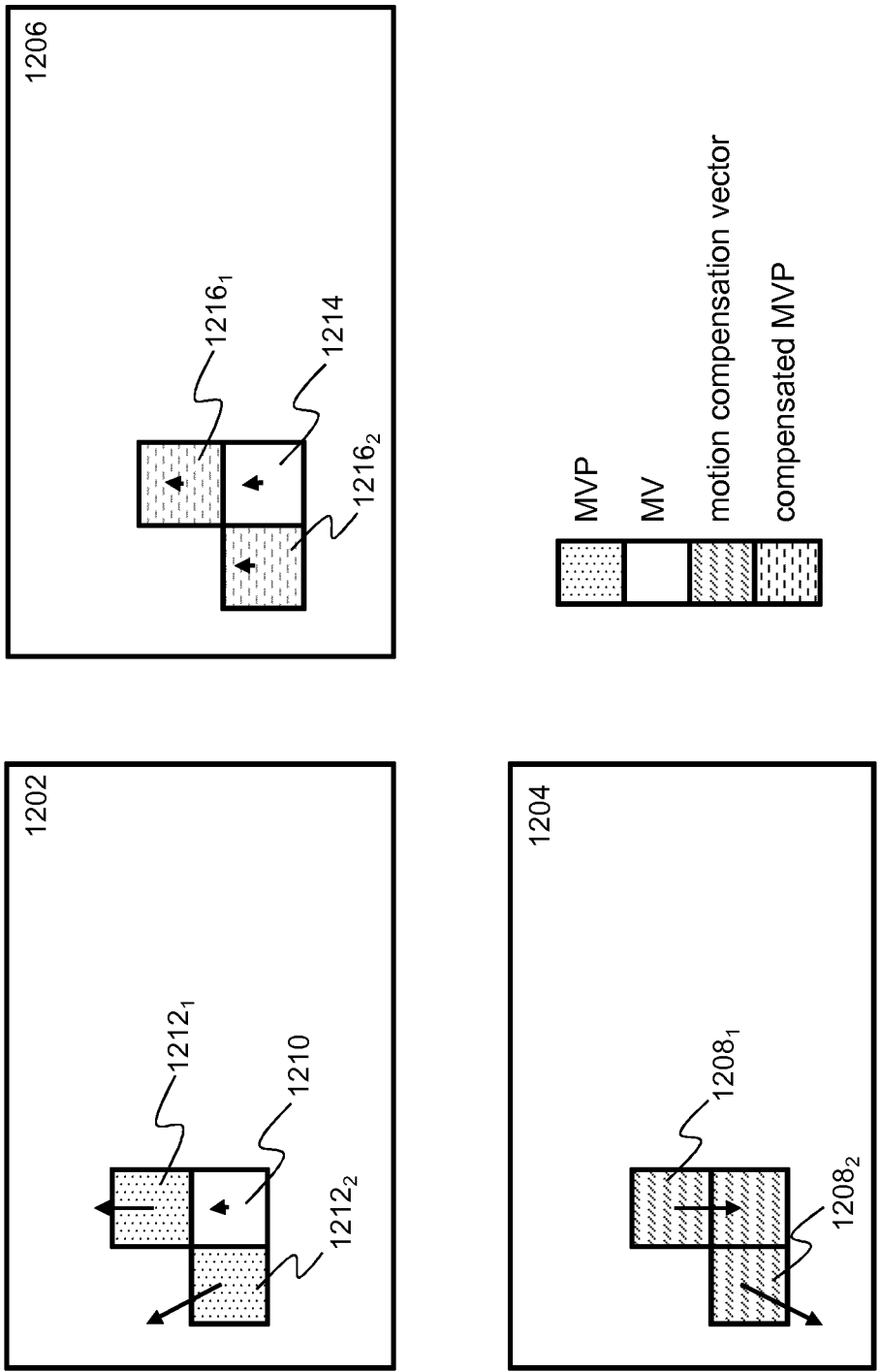
FIG. 12 illustrates the use of motion compensation vectors in a video coding process according to an embodiment of the invention.

FIG. 12 illustrates the use of motion compensation vectors in a video coding process according to an embodiment of the invention. FIG. 12 depicts part of a video frame 1202 comprising a current video block 1210 that needs to be encoded. As shown in this figure, global motion due to e.g. movement of a camera may cause substantial differences between the magnitude and/or orientation of the MV of the current video block 1210 and MVs of neighbouring video blocks 1212$_{1,2}$. For example, as shown in FIG. 12, global motion in blocks of a video frame may cause a motion vector 1210 of a current video block to be relatively small and/or in a different orientation when compared with MVs of its neighbouring blocks 1212$_{1,2}$ that are already decoded. Motion compensation vectors 1208$_{1,2}$ for compensating global motion in the motion vector predictors 1212$_{1,2}$ may be generated based on a parametric encoder function. When applying, e.g. adding, the motion compensation vectors 1208$_{1,2}$ to motion vectors 1212$_{1,2}$, the resulting compensated motion vectors 1216$_{1,2}$ of video blocks (see video frame 1206) that neighbour the current video block 1214 may have a magnitude and an orientation that is similar to the motion vector of the current video block 1214. This way, motion vectors of blocks neighbouring the current block become suitable motion vector predictor candidates for the motion vector of the current block. The encoder apparatus may use an optimization process to select the best MVP from the MVP candidates. This process may be repeated for all video blocks of the video frame or at least the video blocks in the video frame that are affected by global motion. The compensated motion vector predictors may be used to obtain motion vector differences that are small thereby minimizing or at least reducing the entropy in the signal that needs to entropy coded into a bitstream.

Figure 13:
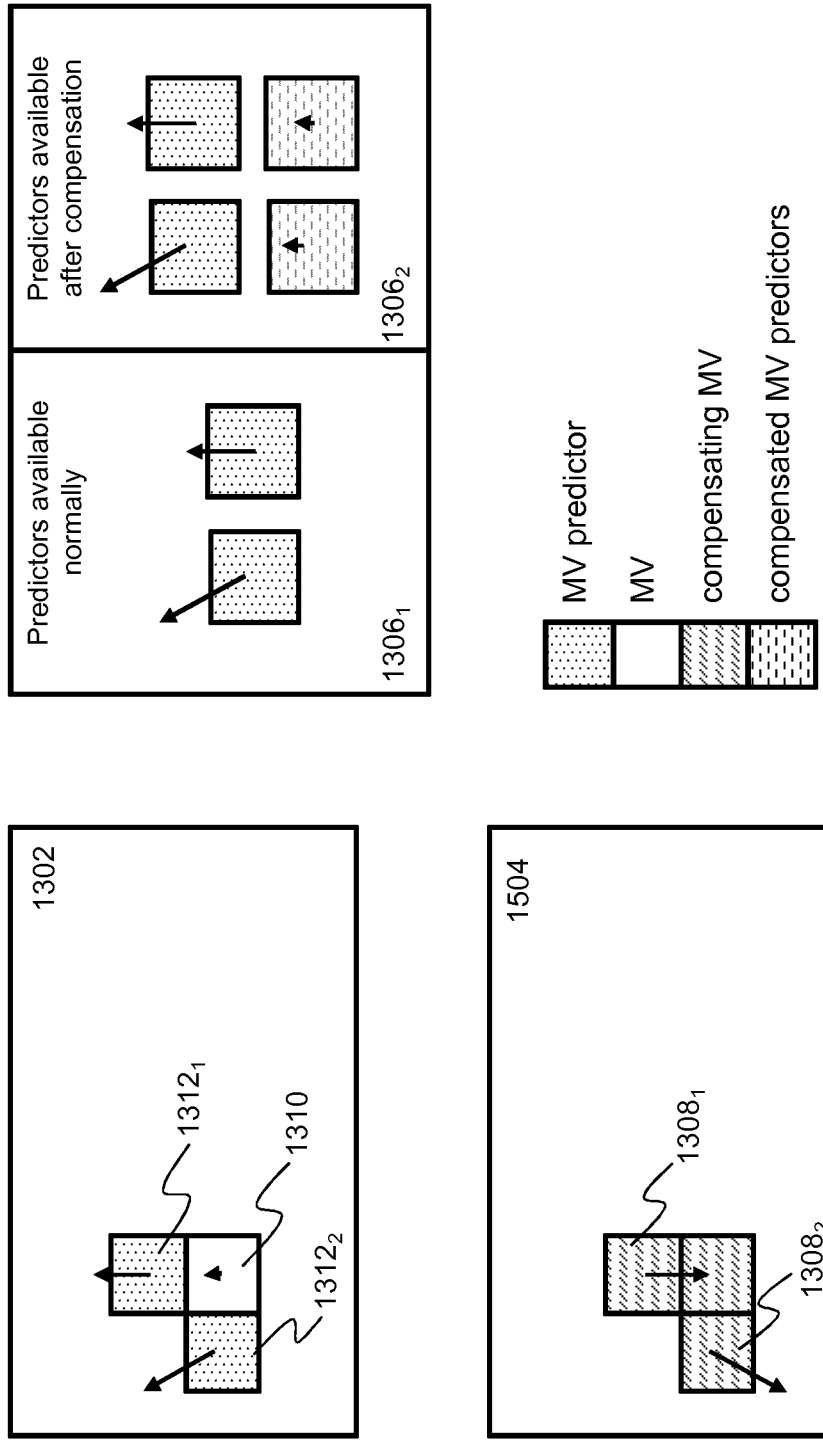
FIG. 13 illustrates the use of motion compensation vectors in a video coding process according to another embodiment of the invention.

FIG. 13 illustrates the use of motion compensation vectors in a video coding process according to another embodiment. The process depicted in FIG. 13 is similar to the one described in FIG. 12, with the exception that in this process both the compensated and the non-compensated motion vectors (as depicted in 1306$_2$) of blocks 1312$_{1,2}$ that neighbour current block 1310 may be considered as motion vector predictor candidates by the encoder apparatus. The encoder apparatus may use an optimization process to select the best MVP from the MVP candidates. Although FIGS. 12 and 13 illustrate the use of motion compensation vectors for compensating motion vector predictors for a motion vector of a current block based on motion vectors of already encoded blocks in the current video frame (i.e. compensation of spatial motion vector predictors), the same can be used to compensate motion vector predictors for a motion vector of a current block based on motion vectors of already encoded blocks of a reference frame (i.e. compensation of temporal motion vector predictors).

Hence, as illustrated in the embodiments described in this application, a motion vector compensation function may be used to improve the compression efficiency of video, in particular spherical video, that is affected by global motion caused by movement of the camera that is used to capture the video.

A parametric function may be used to model (estimate) the global motion in video frames. In particular, the parametric function may be used to provide an estimate of the global motion for blocks in a video frame. To that end, the parametric function may be configured to determine motion compensation information for a block in a video frame. The motion compensation information may be in the form of a motion compensation vector, wherein the x-component of the motion compensation vector provides an estimate of the global motion of a block in the x-direction and the y-component of the motion compensation vector provides an estimate of the global motion of a block in the y-direction. The motion vector compensation values may be determined by the function on the basis of parameters, such as a camera direction in a 3D space, a camera height, etc. Hence, when encoding video frames using a predetermined motion vector compensation function, metadata may be inserted into the bitstream in order to enable a decoder apparatus to reverse the motion compensation process used by the encoder apparatus. Table 2 hereunder provides exemplary model parameters that may be used a parametric function that is used in the embodiments of this application:

| Name | syntax | bits |
|---|---|---|
| mv_compensation_enabled | whether the compensation was used or not | 1 |
| speed | speed at which the camera is travelling - multiplied by a base factor | 5 |
| camera_height | distance that the camera is from the bottom plane - multiplied by a base factor | 3 |
| top_height | distance from the camera to the top plane - multiplied by a base factor | 2 |
| camera_direction | direction in which the camera is moving: divides the frame in 16 "directions" and chooses the most best point | 4 |

Table 2: model parameters for a motion compensation function

As described with reference to FIG. 4A-4D, the parametric function may use a (simple) model including a top plane and a bottom plane wherein the camera moves parallel to these planes for determining motion vector compensation values. For example, using the parameter syntax as defined in table 2, a model for a certain sequence of video frames may be represented using the following exemplary model parameters:

| Parameter name | Example values |
|---|---|
| Camera Speed | 80 |
| Camera height | 10 |
| Top plane height | 50 |
| Camera direction | 0 |

Since the model is used both at the encoder and decoder side, it is desirable to signal this data as part of the bitstream payload. In an embodiment, both the encoder and the decoder may be provided with a parametric function (e.g. pre-programmed in their memories) and parameters used by the parametric function of the encoder to determine motion compensation information for one or more video frames may be signalled to the decoder by simply transmitting the parameters or information to determine the parameters into the bitstream to the decoder. In another embodiment, motion compensation vectors or may be sent in the bitstream to the decoder. In that case, the decoder apparatus does not need to have a parameter function for calculating the motion compensation vectors. Such approach may be advantageous if the motion compensation vectors can be used for a relatively large amount of subsequent video frames, e.g. a relatively long scene that is captures using a moving 360 video. In this case, when a long scene comprising global motion starts, a motion compensation map may be transmitted in the bitstream to the decoder apparatus and small changes in the motion compensation map due to e.g. changes in the camera speed and/or camera direction may be updated by only transmitting motion compensation vector differences to the decoder apparatus.

In an embodiment, metadata associated with the motion compensation schemes described in this application, may be transmitted to the decoder apparatus in VCL NAL units as e.g. known from the AVC and HEVC standards. Signalling these parameters in some metadata packet may introduce the risk of decoding failures when this information is not available, for instance due to a transmission error or data loss after transcoding.

For that reason, in one embodiment, metadata including model parameters may be inserted in a VCL NAL unit, preferably a PPS (Picture Parameter Set) as known from the AVC and HEVC standards. Table 3 provides an exemplary embodiment of a PPS including model parameters for a parametric function in the decoder apparatus:

TABLE 3

| examples of a PPS including model parameters | |
|---|---|
| | Descriptor |
| pic_parameter_set_rbsp( ) { | |
|   pps_pic_parameter_set_id | ue(v) |
|   pps_seq_parameter_set_id | ue(v) |
|   ... | |
|   global_motion_compensation_flag | u(1) |
|   if( global_motion_compensation_flag ) { | |
|     camera_speed | ue(v) |
|     camera_height | ue(v) |
|     camera_direction | ue(v) |
|     top_plane_height | ue(v) |
|   } | |
|   rbsp_trailing_bits( ) | |
| } | |

The syntax of the PPS may be adapted from the HEVC standard wherein the descriptor ue(v) specifies an "unsigned integer 0-th order Exp-Golomb-coded syntax element with the left bit first.". This way each value is not restricted to a certain range of fixed number of bits e.g. 4, 8, etc. . . . . However, implementations may limit the values to such ranges.

In a further embodiment, metadata including model parameters for the parametric function of the decoder apparatus may be signalled in a SEI message. This embodiment provides a possible syntax for a new SEI message as known from the AVC or HEVC standards. Such SEI message is needed for decoding so that the introduction of such message would create a new version of HEVC. Table 4 shows the syntax of the SEI payload which includes a new number payloadType for the SEI message:

TABLE 4 syntax of a SEI payload comprising model parameters.

| | Descriptor |
|---|---|
| sei_payload( payloadType, payloadSize ) {<br>if( nal_unit_type = = PREFIX_SEI_NUT )<br>...<br>    else if( payloadType = = 181 )<br>        alternative_depth_info( payloadSize ) /* specified in Annex I */<br>    else if( payloadType = = 182 )<br>        global_motion_compensation( payloadSize )<br>    else<br>        reserved_sei_message( payloadSize )<br>...<br>} | |

In another embodiment, the motion compensation map may be sent along with bitstream. In this case, the map may not be derived from a physical model of the scene but obtained by any other mean as long as the result of the use of the map is to more efficiently compress the video sequence. A suitable use case for not using a parametric function (parametric algorithm), but instead generating a map directly from an image processing algorithm, may be video wherein a lot of local motion due to numerous objects moving in the scene, is present, or wherein a region of the video scene is not adhering to the global motion pattern (e.g. static area at the bottom of a video when the camera is mounted on the moving vehicle). In an embodiment, an image processing algorithm may be configured to determine a motion field in the current video frame, a motion vector field including a motion vector associated with a pixel or a block of pixels of the current video frame. In the computer vision domain, this motion vector field is called the optical flow as defined by James Gibson around 1940. There exist several image processing algorithms to estimate the optical flow, e.g. phase-correlation, block-based matching (what an encoder does for the purpose of block-based motion compensation), differential methods or discrete optimization methods, etc. Once the optical flow is estimated, the motion compensation map can be based on that estimated optical flow and transmitted in the bitstream. Additionally Thus a conventional image processing algorithm may be used to analyse video frames, to determine a motion field associated with the video data of the video frames and to classify motion vectors into location motion vectors and global motion vectors. The classified global motion vectors may be used as motion compensation vectors for compensating the global motion contribution in motion vectors during video coding. In an embodiment, the determination of the motion compensation map by the encoder may be performed via rate distortion loop such that the obtained motion compensation map ensures a gain in compression efficiency. When the map is transmitted explicitly in the bitstream it is important that the syntax allows a sufficient compression of the map otherwise the compression gain obtained by using the map may be cancelled out by the bits needed to transmit the map. To efficiently transmit a motion compensation map, one may observe that the map is symmetrical with respect to the vertical and/or horizontal axes. If both symmetries are present, only one quarter of the map needs to be transmitted and the rest can be derived from these values based on the symmetry properties. Hence, in an embodiment, if the motion compensation map exhibits symmetry properties, e.g. one or more symmetries with respect to the coordinate system the vectors are defined, only a part of the motion compensation map may be transmitted to the decoder apparatus, wherein an algorithm in the decoder apparatus may expand the map based on the symmetry properties of the map. In addition, the motion compensation map may contain similar values which can be efficiently encoded with known encoding algorithms such as run-length encoding. An example syntax for transmitting the map in the bitstream is provided below in table 5:

TABLE 5 a syntax of a motion compensation map in the bitstream

| | Descriptor |
|---|---|
| motion_vector_compensation_map( payloadSize ){<br>    width_of_mv_compensation_map<br>    height_of_mv_compensation_map<br>    for( i = 0; i <= height_of_mv_compensation_map; i++ ) {<br>        for( j = 0; j <= width_of_mv_compensation_map; j++ ) {<br>            mv_map[i][j]<br>        }<br>    }<br>} | <br>ue(v)<br>ue(v)<br><br><br>se(v) |

Where ue(v) is unsigned integer 0-th order Exp-Golomb-coded syntax element with the left bit first as defined in the HEVC standard and se(v) is signed integer 0-th order Exp-Golomb-coded syntax element as defined in the HEVC standard. As mentioned above, the map can be further compressed by only transmitting a part, e.g. one or two quadrants of the map, the rest being derived by symmetry. An example syntax for transmitting only a quadrant of the map in the bitstream is provided below in table 6:

TABLE 6 a syntax of a quadrant of a symmetrical motion compensation map in the bitstream

| | Descriptor |
|---|---|
| motion_vector_compensation_map( payloadSize ){<br>    width_of_mv_compensation_map | ue(v) |
|     height_of_mv_compensation_map | ue(v) |
|     vertical_symetry_present | u(1) |
|     horizontal_symetry_present | u(1) |
|     for( i = 0; i <= height_of_mv_compensation_map; i++ ) {<br>        for( j = 0; j <= width_of_mv_compensation_map; j++ ) {<br>            if( (i >= height_of_mv_compensation_map/2 &&<br>!horizontal_symetry_present) \|\| (j >= width_of_mv_compensation_map/2 &&<br>!vertical_symetry_present)) {<br>                mv_map[i][j] | se(v) |
|             }<br>        }<br>    }<br>} | |

In practice, it means that:
- Top-left quadrant is always transmitted
- Top-right quadrant is not transmitted if vertical symmetry present
- Bottom-left quadrant is not transmitted if horizontal symmetry present
- Bottom-right quadrant is not transmitted if vertical or horizontal present In an embodiment, the motion compensation map or a part thereof may be transmitted as SEI message, in the non-VCL NAL unit such as the Picture Parameter Set, for HEVC or related video coding standards or similar data unit in other video coding standards.

Problems associated with global motion as discussed in this application may arise when using state of the art video codecs such as HEVC or other coding systems wherein already encoded motion vectors cannot efficiently a current block of a video frame because of global motion. Therefore, the embodiments in this application may be used in a similar manner to other video coding standards such as VP9 or AV1 as these video coding standards rely on compression of motion vectors based on motion vector predictors associated with blocks that have been already encoded. Hence, in an embodiment, model parameters for a parametric algorithm (parametric function) in a decoder apparatus may be signalled in a message that has a syntax that is compliant with the VP9 coding standard. Table 7 provides an example of such message syntax:

TABLE 7 syntax of a VP9 message comprising model parameters

| | Descriptor |
|---|---|
| scene_info( payloadSize ){ | |
|     camera_speed | ue(v) |
|     camera_height | ue(v) |
|     camera_direction | ue(v) |
|     top_plane_height | ue(v) |
| } | |

According to the AV1 specification, the AV1 coding system uses well-known motion compensation techniques wherein motion vectors are signalled in order to achieve reduction of the of the redundancy between a block of pixels that moved from one frame to another. Additionally, AV1 may also use reduction of the motion vector signalling by predicting the motion vectors and then only signal a delta (a difference) compared to the real motion vector. The draft specification further teaches that the prediction relies on motion vectors associated with blocks that are close to the block for which the motion vector needs to be predicted. Thus, the embodiments described in this this application may also be used in the AV1 standard or any further codec standards that use the well-known concept of motion vectors and motion vector predictors.

In a further embodiment, the signalled model parameters or the explicit MV compensation map and its applicability to each frame can be disabled by a flag in metadata related to each frame. For instance, a flag in a slice header of a HEVC bitstream can signal whether the explicit or implicit signalled MV compensation map was used for a given frame. This way, the encoder may choose to use the technique for several frames and then not use it for few frames without the need remove the signalled model parameters or the explicit MV compensation map from the bitstream. A syntax of a flag in a slice header is provided in table 8:

TABLE 8 syntax of a flag in a slice header

| | Descriptor |
|---|---|
| slice_segment_header( ) { | |
| ... | |
|     global_motion_compensation_enabled_flag | u(1) |
| ... | |
| } | |

Figure 14:
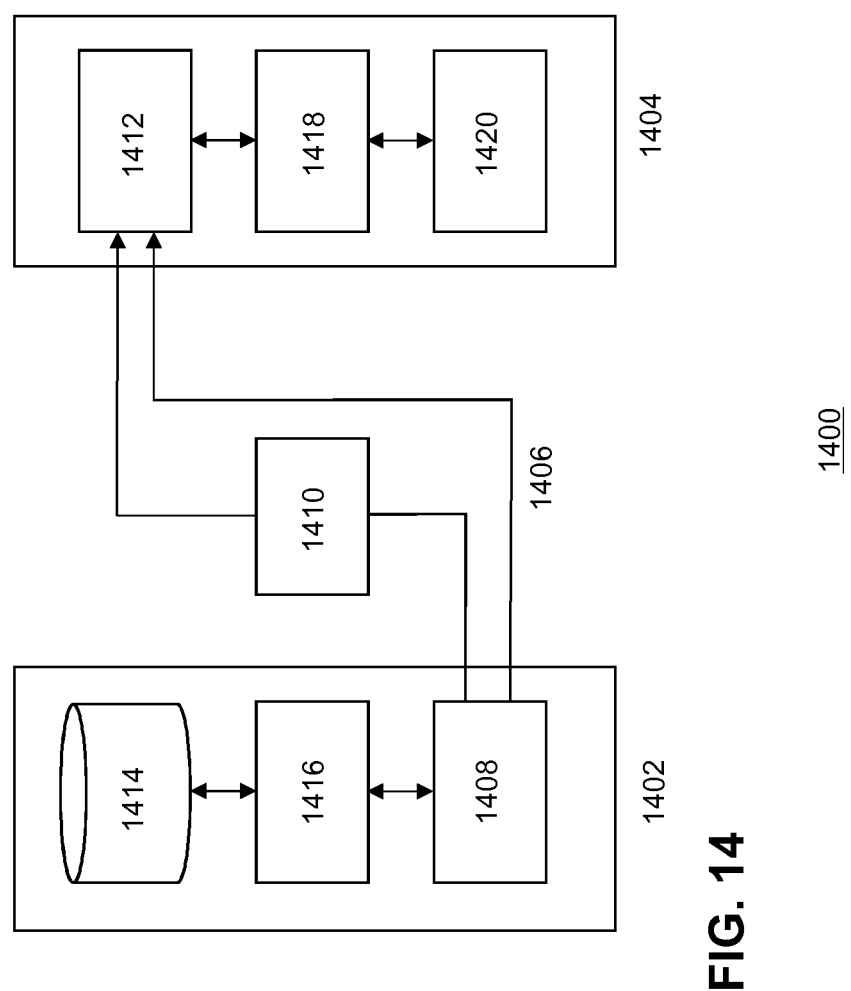
FIG. 14 depicts a block diagram illustrating an exemplary data processing system that may be used with embodiments described in this disclosure.

FIG. 14 depicts a schematic of a video encoding and decoding system 1400 that may use the techniques described in this application. As shown in FIG. 14, system 1400 may include a first video processing device 1402, e.g. a video capturing device or the like, configured to generate encoded video data which may be decoded by a second video processing device 1404, e.g. a video playout device. First and second video processing devices may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the video processing devices may be equipped for wireless communication.

The second video processing device may receive the encoded video data to be decoded through a transmission channel 1406 or any type of medium or device capable of moving the encoded video data from the first video processing device to the second video processing device. In one example, the transmission channel may include a communication medium to enable the first video processing device to transmit encoded video data directly to the second video processing device in real-time. The encoded video data may be transmitted based on a communication standard, such as a wireless communication protocol, to the second video processing device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, servers or any other equipment that may be useful to facilitate communication between first and second video processing devices.

Alternatively, encoded data may be sent via an I/O interface 1408 of the first video processing device to a storage device 1410. Encoded data may be accessed by input an I/O interface 1412 of the second video processing device. Storage device 1410 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may hold the encoded video generated by the first video processing device. The second video processing device may access stored video data from storage device via streaming or downloading. The file server may be any type of server capable of storing encoded video data and transmitting that encoded video data to the second video processing device. Example file servers include a web server (e.g., for a website), an FTP server, network attached storage (NAS) devices, or a local disk drive. The second video processing device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 1400 may be configured to support one-way or two-way video transmission to support applications such as video streaming, video playback, video broadcasting, and/or video telephony.

In the example of FIG. 1, the first video processing device may further include a video source 1414 and a video encoder 1416. In some cases, I/O interface 1408 may include a modulator/demodulator (modem) and/or a transmitter. The video source may include any type of source such as a video capture device, e.g., a video camera, a video archive containing previously captured video, a video feed interface to receive video from a video content provider, and/or a computer graphics system for generating computer graphics data as the source video, or a combination of such sources. If video source 1414 is a video camera, the first and second video processing device may form so-called camera phones or video phones. However, the techniques described in this disclosure may be applicable to video coding in general, and may be applied to wireless and/or wired applications.

The captured, pre-captured, or computer-generated video may be encoded by video encoder 1416. The encoded video data may be transmitted directly to the second video processing device via I/O interface 1408. The encoded video data may also (or alternatively) be stored onto storage device 1410 for later access by the second video processing device or other devices, for decoding and/or playback.

The second video processing device may further comprise a video decoder 1418, and a display device 1420. In some cases, I/O interface 1412 may include a receiver and/or a modem. I/O interface 1412 of the second video processing device may receive the encoded video data. The encoded video data communicated over the communication channel, or provided on storage device 1410, may include a variety of syntax elements generated by video encoder 1416 for use by a video decoder, such as video decoder 1418, in decoding the video data. Such syntax elements may be included with the encoded video data transmitted on a communication medium, stored on a storage medium, or stored a file server.

Display device 1420 may be integrated with, or external to, the second video processing device. In some examples, second video processing device may include an integrated display device and also be configured to interface with an external display device. In other examples, second video processing device may be a display device. In general, display device displays the decoded video data to a user, and may comprise any of a variety of display devices such as a liquid crystal display (LCD), a plasma display, an organic light emitting diode (OLED) display, or another type of display device.

Video encoder 1416 and video decoder 1418 may operate according to a video compression standard, such as the High Efficiency Video Coding (HEVC), VP9 or AV1. Alternatively, video encoder 1416 and video decoder 1418 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

Although not shown in FIG. 1, in some aspects, video encoder 1416 and video decoder 1418 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 1416 and video decoder 1418 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 1416 and video decoder 1418 may be included in one or more encoders or decoders, either of which may be integrated as part of a combined encoder/decoder (CODEC) in a respective device.

This disclosure may generally refer to video encoder "signaling" certain information to another device, such as video decoder. The term "signaling" may generally refer to the communication of syntax elements and/or other data (metadata) used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of providing a bitstream comprising video data encoded by an encoder apparatus, the method comprising:

a processor of the encoder apparatus determining a motion vector of a current block of a current video frame of a sequence of video frames comprising video data captured by a video capturing device, the motion vector defining an offset of the current block relative to a prediction block of an already encoded first reference video frame stored in a memory of the encoder apparatus, wherein at least part of the offset defined by the motion vector is associated with global motion in the video data when the video capturing device is moving relative to a scene, and wherein a difference between the current block and the prediction block defines a residual block;

the processor determining motion vector predictor candidates for predicting the motion vector, the motion vector predictor candidates being determined by the processor based on one or more motion vectors of one or more already encoded blocks of the current video frame and/or one or more already encoded blocks of one or more reference video frames, stored in the memory of the encoder apparatus;

the processor determining or receiving a motion compensation vector for each of the motion vector predictor candidates, a motion compensation vector providing an estimate of a part of a motion vector predictor candidate that is associated with global motion;

the processor determining global motion compensated motion vector predictor candidates, each of the compensated motion vector predictor candidates being determined based on a difference between a motion vector predictor candidate and an associated motion compensation vector; selecting a compensated motion vector predictor from the global motion compensated motion vector predictor candidates; and determining a motion vector difference based on the compensated motion vector predictor and the motion vector; and the processor using an entropy coding algorithm to code into the bitstream: the residual block, the motion vector difference, an indication, that the motion vector difference is based on a difference between the motion vector and a compensated motion vector predictor, an indication of the selected compensated motion vector predictor, and conversion information for converting a motion vector predictor into a compensated motion vector predictor.

2. The method according to claim 1 wherein the candidate list is an indexed list and wherein the indication of the compensated motion vector predictor selected by the encoder apparatus includes an index of the motion vector predictor in the candidate list.

3. The method according to claim 1, wherein the conversion information comprises an indication of an algorithm used by the encoder apparatus to determine the motion compensation vector; and/or, one or more parameters for an algorithm stored in the decoder to determine the motion compensation vector, at least part of the one or more parameters being associated with the movement of the video capturing device relative to the scene, the at least part of the one or more parameters being at least one of: a speed of the video capturing device relative to the scene, a height of the video capturing device relative to a reference point, or a direction in which the video capturing device is moving relative to the scene.

4. The method according to claim 1, wherein the motion compensation vector is part of a motion compensation map comprising motion compensation vectors for blocks of the current video frame and/or the reference video frame.

5. The method according to claim 1, wherein the conversion information comprises the motion compensation vector or a motion compensation map comprising motion compensation vectors for blocks of the current video frame, the sequence of video frame that includes the current video frame and/or the reference video frame.

6. The method according to claim 1, wherein determining a motion vector difference comprises:
   determining both a first motion vector difference candidate based on the compensated motion vector predictor and the motion vector, and a second motion vector difference candidate based on the motion vector predictor and the motion vector; and
   selecting the motion vector difference from the first and second motion vector difference candidate based on an optimization process.

7. The method according to claim 1, wherein the motion compensation vector is determined based on a parametric algorithm, the algorithm being configured to generate an estimate of the global motion for the current block of the video frame, the algorithm representing a parametric world model.

8. The method according to claim 1, wherein the motion compensation vector is determined based on an image processing algorithm, the algorithm being configured to determine a motion field in the current video frame, a motion field including a motion vector associated with a pixel or a block of pixels of the current video frame, and the algorithm being further configured to classify motion vectors of the motion field in motion vectors representing local motion in the current video frame and motion vectors representing global motion in the current video frame.

9. The method according to claim 1, wherein the video capturing device is adapted to capture spherical video data and wherein video frames of the sequence of video frames comprise spherical video data, the spherical video data being projected onto a rectangular video frame on the basis of a projection model, wherein the projection model is an equirectangular or a cubic projection model.

10. The method according to claim 1, wherein at least part of the conversion information is included in the bitstream as particular information, the particular information being at least one of: one or more SEI messages or one or more network abstraction layer, NAL, units.

11. The method according to claim 1, wherein the determining of the motion vector and the motion vector predictor and the coding is based on a coding standard, wherein the coding standard is one of: (i) an AVC, HEVC, VP9, AV1 coding standard or (ii) a coding standard based on of the AVC, HEVC, VP9, AV1 coding standards.

12. A method for reconstructing a block of a video frame from a bitstream encoded by an encoder apparatus, the method comprising:
   a processor of a decoder apparatus receiving a bitstream comprising a current block of a current video frame to be reconstructed by the decoder apparatus based an already decoded prediction block of a first reference video frame stored in the memory of the decoder apparatus and based on a motion vector representing an offset of the current block relative to the prediction block, wherein a difference between the prediction block and the current block defines a residual block;
   the processor using an entropy coding process to decode the bitstream into a residual block, a motion vector difference, an indication that the motion vector difference is based on a difference between a motion vector and a compensated motion vector predictor, an indication of a selected compensated motion vector predictor, and conversion information for converting a motion vector predictor into a compensated motion vector predictor;
   the processor determining motion vector predictor candidates for predicting the motion vector of the current block, a motion vector predictor candidate defining a motion vector of an already decoded block of the current video frame or a motion vector of an already decoded block of a reference video frame stored in the memory of the encoder apparatus;
   the processor using the conversion information for determining a motion compensation vector for each of the motion vector predictor candidates, a motion compensation vector providing an estimate of a part of a motion vector predictor candidate that is associated with global motion, the global motion caused by movement of a video capturing device relative to a scene;
   the processor determining global motion compensated motion vector predictor candidates, each of the compensated motion vector predictor candidates being determined based on a difference between a motion vector predictor candidate and an associated motion compensation vector; selecting a compensated motion vector predictor from the compensated motion vector predictor candidates based on the indication of a selected compensated motion vector predictor; and determining the motion vector of the current block based on the compensated motion vector predictor and the motion vector difference; and
   the processor reconstructing the current block on the basis of the prediction block and the residual block, the reconstruction including using the motion vector to identify the prediction block of the reference video frame stored in the memory of the decoder apparatus.

13. An encoder apparatus comprising:
a processor; and
computer-readable storage storing instructions that, when executed by the processor, cause the encoder apparatus to carry out operations including:
determining a motion vector of a current block of a current video frame of a sequence of video frames comprising video data captured by a video capturing device, the motion vector defining an offset of the current block relative to a prediction block of an already encoded first reference video frame stored in a memory of the encoder apparatus, wherein at least part of the offset is associated with global motion in the video data when the video capturing device is moving relative to a scene, and wherein a difference between the current block and the prediction block defines a residual block,
determining or receiving a motion compensation vector for each of the motion vector predictor candidates, a motion compensation vector providing an estimate of a part of a motion vector predictor candidate that is associated with global motion,
determining or receiving a motion compensation vector for each of the motion vector predictor candidates, a motion compensation vector representing an estimate of global motion of pixels of an already encoded bock of the current video frame or an already encoded block of one of the one or more reference video frames, the global motion resulting from movement of the video capturing device relative to the scene,
determining global motion compensated motion vector predictor candidates, each of the compensated motion vector predictor candidates being determined based on a difference between a motion vector predictor candidate and an associated motion compensation vector; selecting a compensated motion vector predictor from the global motion compensated motion vector predictor candidates; and determining a motion vector difference based on the compensated motion vector predictor and the motion vector; and using an entropy coding algorithm to code into the bitstream the residual block, the motion vector difference, an indication that the motion vector difference is based on a difference between the motion vector and a compensated motion vector predictor; an indication of the selected compensated motion vector predictor; and conversion information for converting a motion vector predictor into a compensated motion vector predictor.

14. A decoder apparatus comprising:

a processor; and computer-readable storage storing instructions that, when executed by the processor, cause the decoder apparatus to carry out operations including:

receiving a bitstream comprising a current block of a current video frame to be reconstructed by the decoder apparatus based an already decoded prediction block of a first reference video frame stored in the memory of the decoder apparatus and based on a motion vector representing an offset of the current block relative to the prediction block, wherein a difference between the prediction block and the current block defines a residual block, using an entropy coding process to decode the bitstream into a residual block, a motion vector difference, an indication that the motion vector difference is based on a difference between a motion vector and a compensated motion vector predictor, an indication of a selected compensated motion vector predictor, and conversion information for converting a motion vector predictor into a compensated motion vector predictor, determining motion vector predictor candidates for predicting the motion vector of the current block, a motion vector predictor candidate defining a motion vector of an already decoded block of the current video frame or a motion vector of an already decoded block of a reference video frame stored in the memory of the decoder apparatus, using the conversion information for determining a motion compensation vector for each of the motion vector predictor candidates, a motion compensation vector providing an estimate of a part of a motion vector predictor candidate that is associated with global motion, the global motion resulting from movement of a video capturing device relative to a scene, determining global motion compensated motion vector predictor candidates, each of the compensated motion vector predictor candidates being determined based on a difference between a motion vector predictor candidate and an associated motion compensation vector; selecting a compensated motion vector predictor from the compensated motion vector predictor candidates based on the indication of a selected compensated motion vector predictor; and, determining the motion vector of the current block based on the compensated motion vector predictor and the motion vector difference, and reconstructing the current block on the basis of the prediction block and the residual block, the reconstruction including using the motion vector to identify the prediction block of the reference video frame stored in the memory of the decoder apparatus.

15. A non-transitory computer-readable medium having instructions stored thereon that, when executed by a processor of an encoder apparatus, cause the encoder apparatus to carry out operations including:

determining a motion vector of a current block of a current video frame of a sequence of video frames comprising video data captured by a video capturing device, the motion vector defining an offset of the current block relative to a prediction block of an already encoded first reference video frame stored in a memory of the encoder apparatus, wherein at least part of the offset defined by the motion vector is associated with global motion in the video data when the video capturing device is moving relative to a scene, and wherein a difference between the current block and the prediction block defines a residual block;

determining motion vector predictor candidates for predicting the motion vector, the motion vector predictor candidates being determined by the processor based on one or more motion vectors of one or more already encoded blocks of the current video frame and/or one or more already encoded blocks of one or more reference video frames stored in the memory of the encoder apparatus;

determining or receiving a motion compensation vector for each of the motion vector predictor candidates, a motion compensation vector providing an estimate of a part of a motion vector predictor candidate that is associated with global motion;

determining global motion compensated motion vector predictor candidates, each of the compensated motion vector predictor candidates being determined based on a difference between a motion vector predictor candidate and an associated motion compensation vector; selecting a compensated motion vector predictor from the global motion compensated motion vector predictor candidates; and determining a motion vector difference based on the compensated motion vector predictor and the motion vector; and using an entropy coding algorithm to code into the bitstream: the residual block, the motion vector difference, an indication that the motion vector difference is based on a difference between the motion vector and a compensated motion vector predictor, an indication of the selected compensated motion vector predictor, and conversion information for converting a motion vector predictor into a compensated motion vector predictor.

16. A non-transitory computer-readable medium having instructions stored thereon that, when executed by a processor of an decoder apparatus, cause the decoder apparatus to carry out operations including:

a processor of a decoder apparatus receiving a bitstream comprising a current block of a current video frame to be reconstructed by the decoder apparatus based an already decoded prediction block of a first reference video frame stored in the memory of the decoder apparatus and based on a motion vector representing an offset of the current block relative to the prediction block, wherein a difference between the prediction block and the current block defines a residual block;

the processor using an entropy coding process to decode the bitstream into a residual block, a motion vector difference, an indication that the motion vector difference is based on a difference between a motion vector and a compensated motion vector predictor, an indication of a selected compensated motion vector predictor, and conversion information for converting a motion vector predictor into a compensated motion vector predictor;

the processor determining motion vector predictor candidates for predicting the motion vector of the current block, a motion vector predictor candidate defining a motion vector of an already decoded block of the current video frame or a motion vector of an already decoded block of a reference video frame stored in the memory of the encoder apparatus;

the processor using the conversion information for determining a motion compensation vector for each of the motion vector predictor candidates, a motion compensation vector providing an estimate of a part of a motion vector predictor candidate that is associated with global motion, the global motion caused by movement of a video capturing device relative to a scene;

the processor determining global motion compensated motion vector predictor candidates, each of the compensated motion vector predictor candidates being determined based on a difference between a motion vector predictor candidate and an associated motion compensation vector; selecting a compensated motion vector predictor from the compensated motion vector predictor candidates based on the indication of a selected compensated motion vector predictor; and determining the motion vector of the current block based on the compensated motion vector predictor and the motion vector difference; and the processor reconstructing the current block on the basis of the prediction block and the residual block, the reconstruction including using the motion vector to identify the prediction block of the reference video frame stored in the memory of the decoder apparatus.

* * * * *